(12) United States Patent
Seo et al.

(10) Patent No.: US 6,771,973 B2
(45) Date of Patent: Aug. 3, 2004

(54) METHOD AND APPARATUS FOR SETTING MAIN-SUB RELATION OF ELECTRONIC APPLIANCES

(75) Inventors: Masayoshi Seo, Higashihiroshima (JP); Manabu Toda, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 502 days.

(21) Appl. No.: 09/772,068

(22) Filed: Jan. 30, 2001

(65) Prior Publication Data

US 2002/0028685 A1 Mar. 7, 2002

(30) Foreign Application Priority Data

Feb. 14, 2000 (JP) ........................................ 2000-034987

(51) Int. Cl.[7] ................................................ H04Q 7/20
(52) U.S. Cl. ...................... 455/462; 455/410; 455/411; 455/435.1
(58) Field of Search ................................ 455/403, 410, 455/411, 433, 435.1, 462, 464, 465, 550.1, 551, 552.1, 554.1, 554.2, 555

(56) References Cited

U.S. PATENT DOCUMENTS

| | | | | |
|---|---|---|---|---|
| 4,864,599 A | * | 9/1989 | Saegusa et al. | 455/411 |
| 5,077,790 A | * | 12/1991 | D'Amico et al. | 380/249 |
| 5,179,373 A | * | 1/1993 | John | 340/5.9 |
| 5,297,192 A | * | 3/1994 | Gerszberg | 455/419 |
| 5,386,455 A | * | 1/1995 | Cooper | 455/419 |
| 5,465,288 A | * | 11/1995 | Falvey et al. | 455/418 |
| 5,603,084 A | * | 2/1997 | Henry et al. | 455/419 |
| 5,794,141 A | * | 8/1998 | Zicker | 455/418 |
| 5,878,339 A | * | 3/1999 | Zicker et al. | 455/419 |
| 6,064,725 A | * | 5/2000 | Nakanishi | 379/140 |
| 6,577,858 B1 | * | 6/2003 | Gell | 455/407 |

FOREIGN PATENT DOCUMENTS

JP          8-223282         8/1996

* cited by examiner

*Primary Examiner*—William Trost
*Assistant Examiner*—Stephen D'Agosta
(74) *Attorney, Agent, or Firm*—Nixon & Vanderhye P.C.

(57) ABSTRACT

A main-sub relation setting apparatus for setting a main-sub relation of a cordless telephone system including a main unit and one or more sub units connected to the main unit is provided. The main unit is placed at a first location, and the main-sub relation setting apparatus and a sub unit to be newly connected to the main unit are placed at a second location different from the first location. The main-sub relation setting apparatus includes a retail outlet terminal reading main unit information for the main unit to identify itself, and a setting terminal connected to a sub unit to be newly connected to the main unit and to the retail outlet terminal, for writing the main unit information read by the retail outlet terminal to a memory of the sub unit to be newly connected to the main unit.

17 Claims, 12 Drawing Sheets

METHOD AND APPARATUS FOR SETTING MAIN-SUB RELATION OF ELECTRONIC APPLIANCES

BACKGROUND OF THE INVENTION

1. Field of the Invention

The present invention relates to a technique for setting main-sub (parent-child) relation of electronic appliances such as a cordless telephone system including a main (parent) unit and a sub (child) unit wireless-connected to the main unit. More specifically, the present invention relates to a method and apparatus for setting main-sub relation enabling easy expansion (addition) of a sub unit.

2. Description of the Background Art

Recently, a cordless telephone system allowing use of a plurality of sub units has come to be widely used. When the cordless telephone systems are sold, cases that the systems including one main unit and two or more sub units, sold as a set are few. In most cases, a user purchases one main unit and one sub unit and, additionally buys another sub unit when it becomes necessary afterward. In such a case, it is necessary to register in the additional sub unit purchased afterward, the same call identification (hereinafter referred to as ID) as the main unit, or the information that the number of sub units is increased by one, in the main unit.

For this purpose, generally, the main unit and the sub unit of the cordless telephone system has a special operational mode, referred to as an expansion mode, different from a normal mode. When a sub unit is to be added, the operational mode of the main unit and the new sub unit to be added is changed from the normal mode to the expansion mode by a special operation. When a sub unit No. of the sub unit to be added is input to the main unit in the expansion mode, the main unit transmits, by wireless communication, the sub unit No. and a signal instructing addition, to the sub unit. The sub unit receives these, and writes the ID and the sub unit No. in a memory.

Thereafter, the sub unit transmits a signal acknowledging reception of the signal instructing addition, to the main unit. Upon reception of this acknowledgement signal, the main unit determines that expansion (addition) has successfully completed, and writes information that a sub unit is added, in a memory. Thus, the new sub unit that has stored the same sub unit No. and the ID as the main unit is now capable of wireless connection with the main unit.

When an added sub unit fails or becomes unnecessary, it becomes necessary to cancel information of the sub unit that is not used, stored in the main unit. Therefore, a process is necessary in which the operational mode of the main unit is changed from the normal mode to a cancellation mode and the information of the sub unit that is not used is canceled.

In this manner, special operations are necessary for adding or removing a sub unit. In order to prevent erroneous expansion or cancellation, generally, the operation for switching the operational mode from the normal mode to the expansion mode or to the cancellation mode is often intentionally made complicated. Thus, the method of expansion is not easily comprehensible to many users. For example, in order to change the operational mode from the normal mode to the expansion mode, an exemplary necessary procedure is "to turn the power on while continuously pressing a prescribed key." As recent telephone systems, come to have various and many convenient functions, method of operation has come to be more complicated accordingly, confusing the users. Therefore, manufacturers of cordless telephone systems set up inquiry call numbers at retail outlets and customer service centers, to answer inquiries and questions from the users.

Japanese Patent Laying-Open No. 8-223282 discloses a technique that makes easier an operation for the user to add a sub unit to a system. Referring to FIG. 12, the invention described in this laid-open application includes a cordless telephone system including a main unit 1000 connected to a telephone circuit, an existing sub unit 1200 and a new sub unit 1500 to be wireless-connected to main unit 1000, wherein the main unit 1000 includes a first memory storing sub unit information for identifying existing sub unit 1200 and new sub unit 1500 to be connected, and a first memory control circuit for controlling the first memory to store the sub unit information. Each of the existing sub unit 1200 and the new sub unit 1500 includes a second memory storing sub unit information specifying itself, and a second memory control circuit for controlling the second memory to store the sub unit information identifying itself. Main unit 1000 includes a control apparatus enabling the first and second memories to store sub unit information identifying the new sub unit 1500 to be added, while keeping telephone communication with the telephone system 1600 installed at a retail outlet through the telephone circuit.

The control apparatus is capable of letting the first and second memories of main unit 1000 and new sub unit 1500 to be added store the sub unit information identifying the new sub unit 1500 to be added, while the main unit 1000 starts and keeps a telephone call to telephone system 1600 installed in the retail outlet. Thus, it is possible for a user who is not familiar with the process of expansion, to add the new sub unit while making reference to the service person at the retail outlet or the customer service center of the manufacturer of the cordless telephone system, over the connected telephone line.

In accordance with the invention described in the aforementioned laid-open application, however, it is necessary for the user to purchase the new sub unit 1500 at a retail outlet, and to perform the process for adding the new sub unit 1500 by himself at his home, in accordance with an instruction from a salesperson, for example. Therefore, the user's burden, which is considerably increased as the method of setting varies widely and the number of items to be set increases, is still considerably heavy.

SUMMARY OF THE INVENTION

An object of the present invention is to provide a method and an apparatus for setting main-sub relation, enabling setting of a sub unit newly added to a main unit in a simple manner.

Another object of the present invention is to provide an apparatus and a method of setting main-sub relation enabling setting of a sub unit newly added to a main unit at a retail outlet, even when the main unit is placed at a user's home.

A still further object of the present invention is to provide an apparatus and a method of setting main-sub relation enabling a user to purchase a sub unit of which setting for expansion is already completed.

A still further object of the present invention is to provide an apparatus and a method of setting main-sub relation enabling a user to visit a retail outlet and to purchase a sub unit of which setting for expansion is already completed.

A still further object of the present invention is to provide an apparatus and a method of setting main-sub relation that enables comprehension of the state of setting for expansion.

The apparatus for setting main-sub relation in accordance with the present invention is for setting a main-sub relation of electric appliances including one main unit and one or more sub units connected to the main unit. The main unit includes a first storage circuit for storing information identifying itself. The sub unit includes a second storage circuit storing information identifying a main unit to which it is connected. The main-sub relation setting apparatus is capable of communicating with an arbitrary main unit through a first communication medium, and capable of communicating with a sub unit through a second communication medium. The main-sub relation setting apparatus includes a first communication circuit connected to the first communication medium and reading information stored in the first storage circuit of the main unit connected to the main-sub relation setting apparatus through the first communication medium, and a second communication circuit connected to the second communication medium and the first communication circuit and writing information for identifying the main unit to which the sub unit is to be connected, to a second storage circuit of the sub unit connected to the main-sub relation setting apparatus through the second communication medium.

The first communication medium enables communication between the main-sub relation setting apparatus and an arbitrary main unit, and the second communication medium enables communication between the main-sub relation setting apparatus and a sub unit. The first communication circuit reads, through the first communication medium, information (ID or the like different for each main unit, by which the main unit can identify itself) stored in the first storage circuit of an arbitrary main unit. The second communication circuit writes the information of the arbitrary main unit read by the first communication circuit, to the second storage circuit of the sub unit connected to the main-sub relation setting apparatus, through the second communication medium. Thus, the information of the main unit specifying itself stored in the first storage circuit of the main unit can be stored in the second storage circuit of the sub unit, whereby the sub unit can identify the main unit to which it is to be connected.

More preferably, the main unit is placed at a first location, the main-sub relation setting apparatus is placed at a second location different from the first location, and connectable to the main unit by the first communication medium, and the main-sub relation setting apparatus further includes an activating circuit for activating the first and second communication circuits based on information transmitted from the first location.

It is possible to activate the communication circuits based on the information of adding a new sub unit, transmitted from a first location such as the user's home to the main-sub relation setting apparatus placed at the second location, and to perform setting for expansion.

More preferably, the main unit is placed at a first location, the main-sub relation setting apparatus is placed at a second location different from the first location and connectable to the main unit by the first communication medium, and the main-sub relation setting apparatus further includes an activating circuit responsive to an instruction to add a new sub unit to an arbitrary main unit transmitted from the second location, for establishing communication with the designated main unit, and activating the first and second communication circuits.

As the user visits the second location where the main-sub relation setting apparatus is placed and provides an instruction to add a new sub unit on the main-sub relation setting apparatus, the communication circuits are activated based on the instruction, enabling setting for expansion.

More preferably, the main-sub relation setting apparatus further includes a vending unit responsive to the instruction to add a new sub unit to an arbitrary main unit, vending a sub unit, having the information for specifying the main unit to be connected stored by the second communication circuit, in the second storage circuit of the new sub unit.

When the user visits the second location where the main-sub relation setting apparatus is placed and provides an instruction to add a new sub unit in the main-sub relation setting apparatus, it becomes possible to purchase a sub unit in which setting for expansion has been already finished.

More preferably, the main-sub relation setting apparatus further includes a display unit connected to the second communication circuit and displaying communication history between the second communication circuit and the sub unit.

It is possible to monitor a communication error or the like, based on the communication history displayed on the display unit.

The method of setting main-sub relation in accordance with another aspect of the present invention is for setting the main-sub relation in a main-sub relation setting apparatus setting main-sub relation between electric appliances including a main unit and one or more sub units connected to the main unit. The main unit includes a first storage circuit storing information for specifying itself. The sub unit includes a second storage circuit for storing information for specifying a main unit to which it is connected. The main-sub relation setting apparatus is capable of communicating with an arbitrary main unit through a first communication medium, and capable of communicating with a sub unit through a second communication medium. The method of setting main-sub relation includes the steps of: preparing communication with a main unit connected to the main-sub relation setting apparatus through the first communication medium, preparing communication with the sub unit connected to the main-sub relation setting apparatus through the second communication medium, reading information stored in the first storage circuit of the main unit connected to the main-sub relation setting apparatus through the first communication medium, and writing, based on the read information of the main unit, information specifying the main unit to which the sub unit is to be connected, in the second storage circuit of the sub unit connected to the main-sub relation setting apparatus through the second communication medium.

In the step of preparing communication, communication between an arbitrary main unit and a sub unit is prepared. In the step of reading information, the information stored in the first storage circuit of the arbitrary main unit is read through the first communication medium. In the step of writing information, the read main unit information of the arbitrary main unit is written in the second storage circuit of the sub unit connected to the main-sub relation setting apparatus through the second communication medium. Thus, the main unit information identifying the main unit itself stored in the first storage circuit of the main unit can be stored in the second storage circuit of the sub unit, and hence it is possible for the sub unit to identify the main unit to which it is to be connected.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
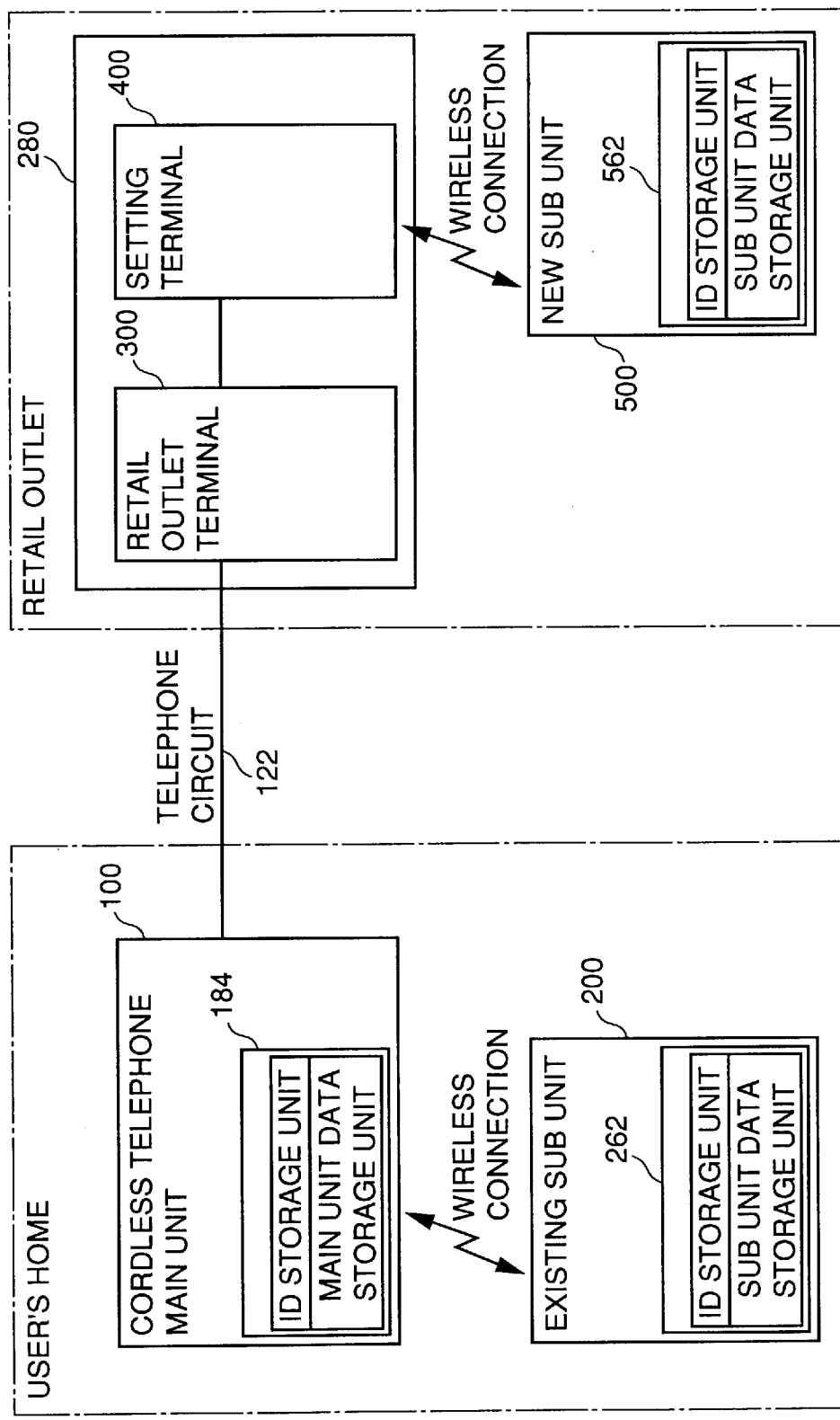
FIG. 1 shows a state of connection between a cordless telephone system and the main-sub relation setting apparatus in accordance with the first embodiment of the present invention.

Embodiments of the present invention will be described with reference to the figures. In the following description and in the drawings, corresponding portions are denoted by the same reference characters. Names and functions of these components are also the same. Therefore, detailed description thereof will not be repeated where appropriate.

First Embodiment

Referring to FIG. 1, a main-sub relation setting apparatus 280 in accordance with the present embodiment is for setting a main-sub relation of electric appliances such as a cordless telephone system including a main unit 100, an existing sub unit 200 connected to main unit 100, and a sub unit 500 which is to be newly connected to main unit 100. Main unit 100 and existing sub unit 200 are installed at a user's home, while the main-sub relation setting apparatus 280 and the new sub unit 500 are at a retail outlet.

Main unit 100 includes a memory 184 storing information specifying itself (ID) and sub unit identifying information of the sub unit connected to itself. The sub unit identifying information may be a sub unit presence/absence flag, or sub unit number information. The sub unit presence/absence flag may be a flag of 8 bits for a main unit to which up to eight (8) sub units can be connected (where a reset flag represents a sub unit unregistered state, while a set flag represents a sub unit registered state). Each bit corresponds to the sub unit information (sub unit No.) of each sub unit. The sub unit number information represents the number of connected sub units. Existing sub unit 200 includes a memory 262 storing information identifying main unit 100 to which it is connected (ID) and information identifying itself (sub unit information). The newly added sub unit 500 includes a memory 562 storing information specifying the main unit 100 to which it is to be connected (ID) and information identifying itself (sub unit information).

Main-sub relation setting apparatus 280 is capable of communicating with main unit 100 through a telephone circuit 122 as the first communication medium, and capable of communicating with a sub unit connected to main unit 100 by wireless connection.

Main-sub relation setting apparatus 280 includes a retail outlet terminal 300 connected to telephone circuit 122 for reading information stored in memory 184 of main unit 100, and a setting terminal 400 connected to retail outlet terminal 300 for writing information of main unit 100 read by retail outlet terminal 300 to memory 562 of sub unit 500 to be connected to main unit 100. Setting terminal 400 and sub unit 500 are capable of communicating with each other by wireless communication as the second communication medium.

Figure 2:
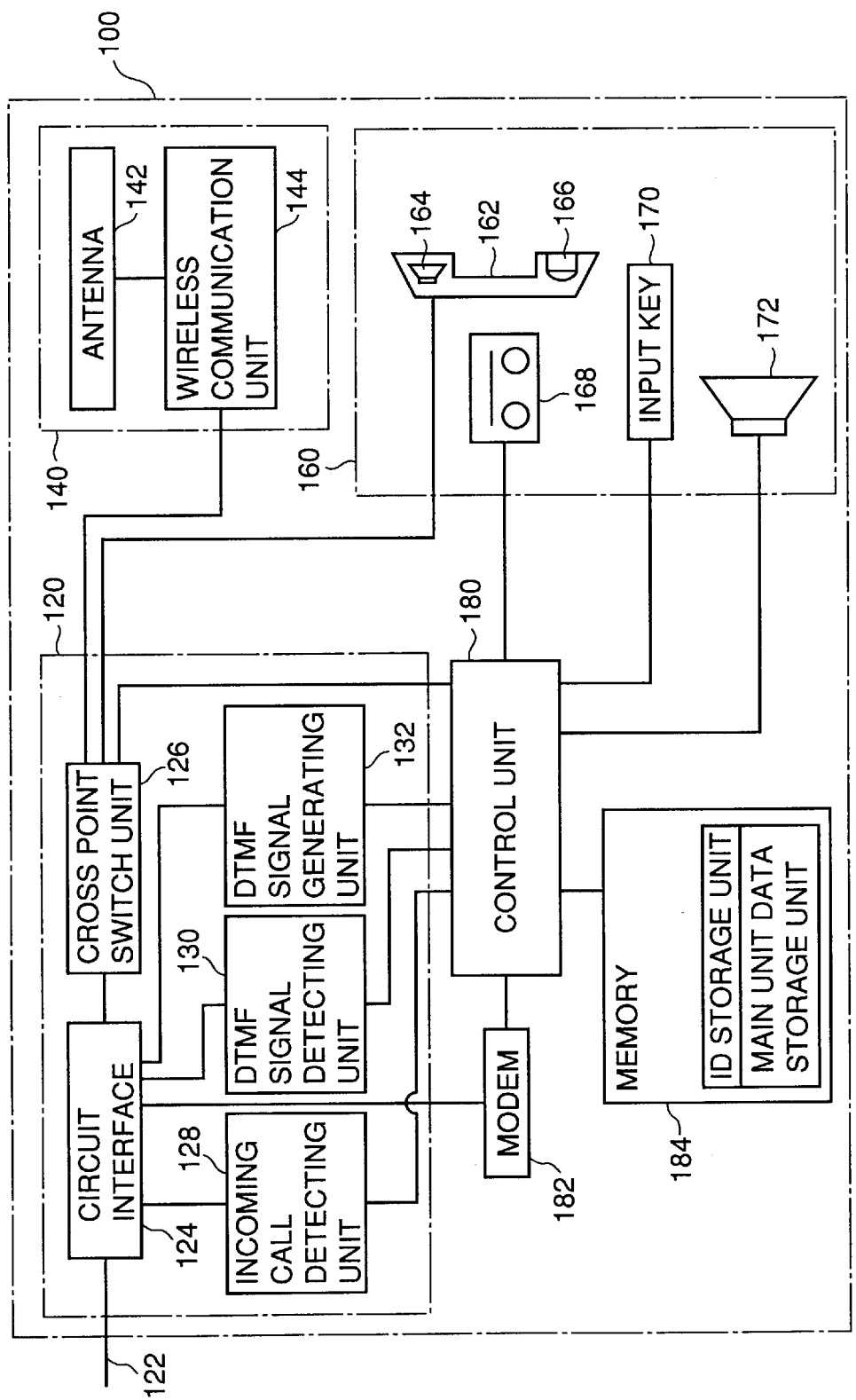
FIG. 2 is a control block diagram of a main unit in accordance with the first embodiment of the present invention.

Referring to FIG. 2, main unit 100 includes: a circuit unit 120 connected by telephone circuit 122 to retail outlet terminal 300; a wireless unit 140 connected to circuit unit 120 and wireless-communicating with sub units 200 and 500; an input/output unit 160 inputting/outputting voices or telephone numbers; a control unit 180 connected to circuit unit 120, wireless unit 140 and input/output unit 160 for controlling various portions of main unit 100; a modem 182 connected to control unit 180 and circuit unit 120, for converting digital data stored in memory 184, which will be described later, to analog signals for transmission; and a memory 184 connected to control unit 180 for storing various data. Modem 182 can be started or terminated by a control signal from control unit 180.

Circuit unit 120 includes: a circuit interface 124 connected to telephone circuit 122 for capturing and releasing telephone circuit 122; a cross point switch unit 126 connected to circuit interface 124, wireless unit 140 and input/output unit 160 for establishing connection between telephone circuit 122 and wireless unit 140, connection between telephone circuit 122 and input/output unit 160, or telephone circuit 122 and sub units 200 and 500 through wireless unit 140, in response to switching on/off by control unit 180; an incoming call detecting unit 128 connected to circuit interface 124 and detecting an incoming signal through telephone circuit 122; a DTMF (Dual Tone Multi Frequency) signal detecting unit 130 connected to circuit interface 124, detecting and analyzing contents of DTMF signals received through telephone circuit 122; and a DTMF signal generating unit 132 connected to circuit interface 124 and outputting a prescribed DTMF signal to telephone circuit 122.

Here, DTMF signal refers to signals representing data such as 0 to 9, ※,# and the like, by combining two frequencies of voice frequency band (high frequency band and low frequency band), and a simple data communication between telephone systems can be realized.

Wireless unit 140 includes an antenna 142 for transmitting/receiving radio wave between each of main unit 100 and sub units 200 and 500, and a wireless communication unit 144 connected to antenna 142 for demodulating a received signal and modulating a signal to be transmitted.

Input/output unit 160 includes a handset 162 connected to cross point switch unit 126 and including a microphone 166 receiving as an input a voice to be transmitted and converting the input voice to audio signals and an earpiece 164 converting received voice signals to output voice; a hook switch 168 connected to control unit 180, detecting end of a call when the handset 162 is placed on a standby position, and detecting start of a call when the handset 162 is lifted up from the standby position; an input key 170 connected to control unit 180 for inputting dial number of the call destination, for example; and a speaker 172 connected to control unit 180, and outputting a ringing tone when an incoming signal is received through telephone circuit 122.

Memory 184 includes an ID storing unit storing the ID of the main unit 100 itself, and a main unit data storing unit for storing information such as the number of sub units connected to itself.

Control unit 180 includes a CPU (Central Processing Unit), an ROM (Read Only Memory), and RAM (Random Access Memory), an input/output interface and the like, and based on the data input through the input/output interface as well as the program and data stored in the ROM and RAM, the CPU controls operations of various portions of main unit 100.

Figure 3:
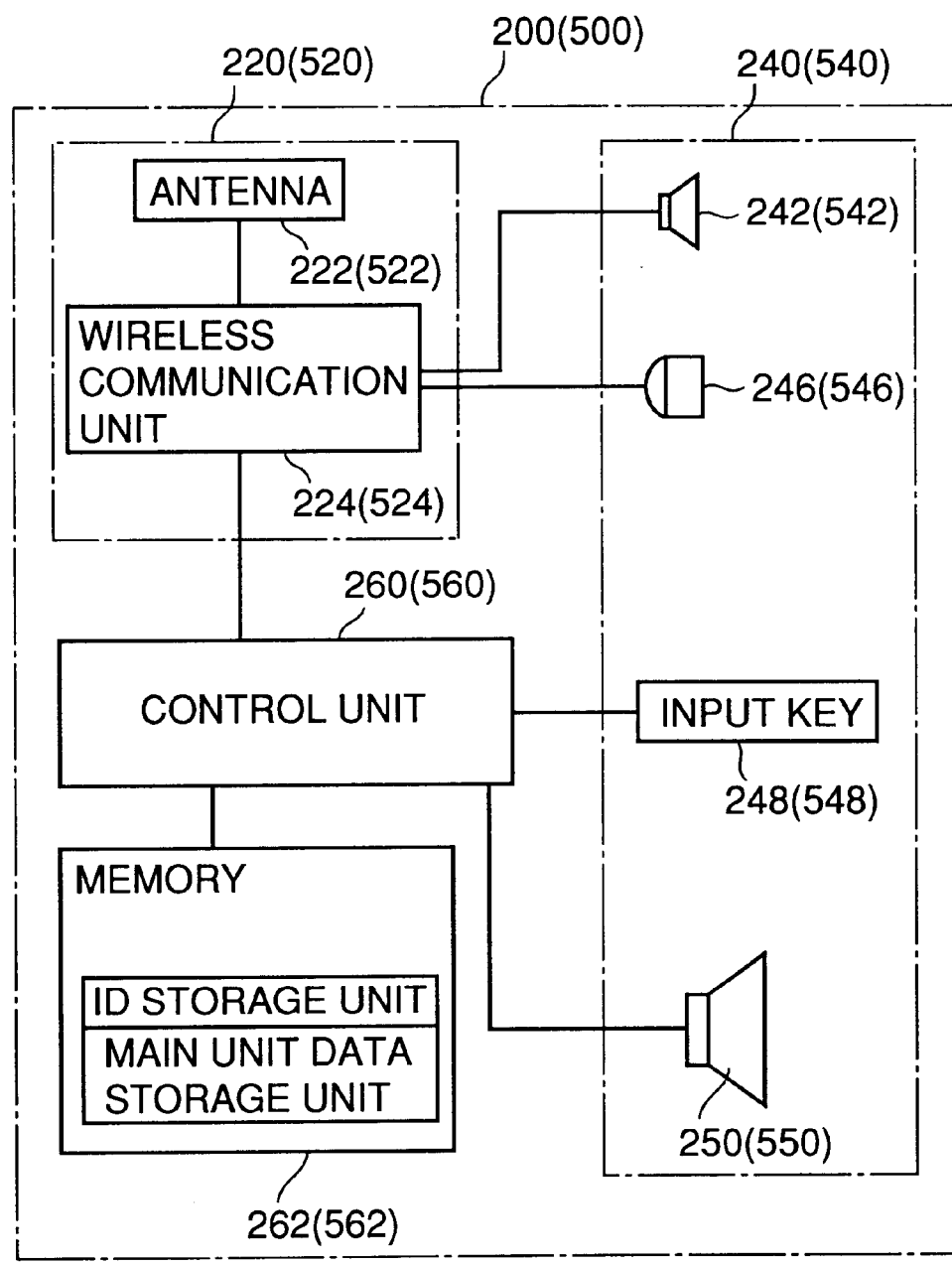
FIG. 3 is a control block diagram of a sub unit in accordance with the first embodiment of the present invention.

Referring to FIG. 3, sub unit 200 (500) includes: a wireless unit 220 (520) for wireless communication with main unit 100; an input/output unit 240 (540) connected to wireless unit 220 (520) for outputting a voice signal received from main unit 100 or inputting voice to main unit 100; a control unit 260 (560) connected to wireless unit 220 (520) and input/output unit 240 (540) for controlling various portions of sub unit 200 (500); and a memory 262 (562) connected to control unit 260 (560) for storing the ID of main unit 100 to which it is connected, for example. The existing sub unit 200 and the newly added sub unit 500 have basically the same structure as regards the addition of sub unit in accordance with the present invention, for the LCD (Liquid Crystal Display) at the input/output unit and associated functions thereof may or may not differ. Therefore, portions having the same structure in sub units 200 and 500 will be described by inserting reference characters of respective portions of existing sub unit 200 together with the corresponding reference characters for the respective portions of the newly connected sub unit 500 (in FIG. 3, the reference characters for the newly added sub unit 500 are given in parenthesis). The sub units 200 and 500 may be dedicated sub units that can be added only to a specific type of main units, or common sub units that can be added to a plurality of different types of main units.

Wireless unit 220 (520) includes an antenna 222 (522) for wireless transmission/reception to and from main unit 100 or setting terminal 400, and a wireless communication unit 224 (524) connected to antenna 222 (522) for demodulating a received signal and modulating a signal to be transmitted.

Input/output unit 240 (540) includes a microphone 246 (546) receiving as an input a voice to be transmitted to main unit 100 and converting the voice to a voice signal, an earpiece 242 (542) converting the voice signal received from main unit 100 and outputting a voice, an input key 248 (548) for inputting a dial number to be transmitted, and a speaker 250 (550) outputting a ringing tone when an incoming signal is received from main unit 100. Input/output unit 240 (540) may include a LCD displaying a dial number or the like input through the input key 248 (548).

Control unit 260 (560) includes a CPU, an ROM, an RAM, an input/output interface and the like, and in accordance with the data input through the input/output interface as well as the program and data stored in the ROM and RAM, the CPU controls prescribed operations of various portions of the sub unit 200 (500).

Memory 262 (562) includes an ID storing unit storing the ID of main unit 100 to which it is connected, as main unit information, and a sub unit data storing unit storing the sub unit No. of itself, as the sub unit information.

Figure 4:
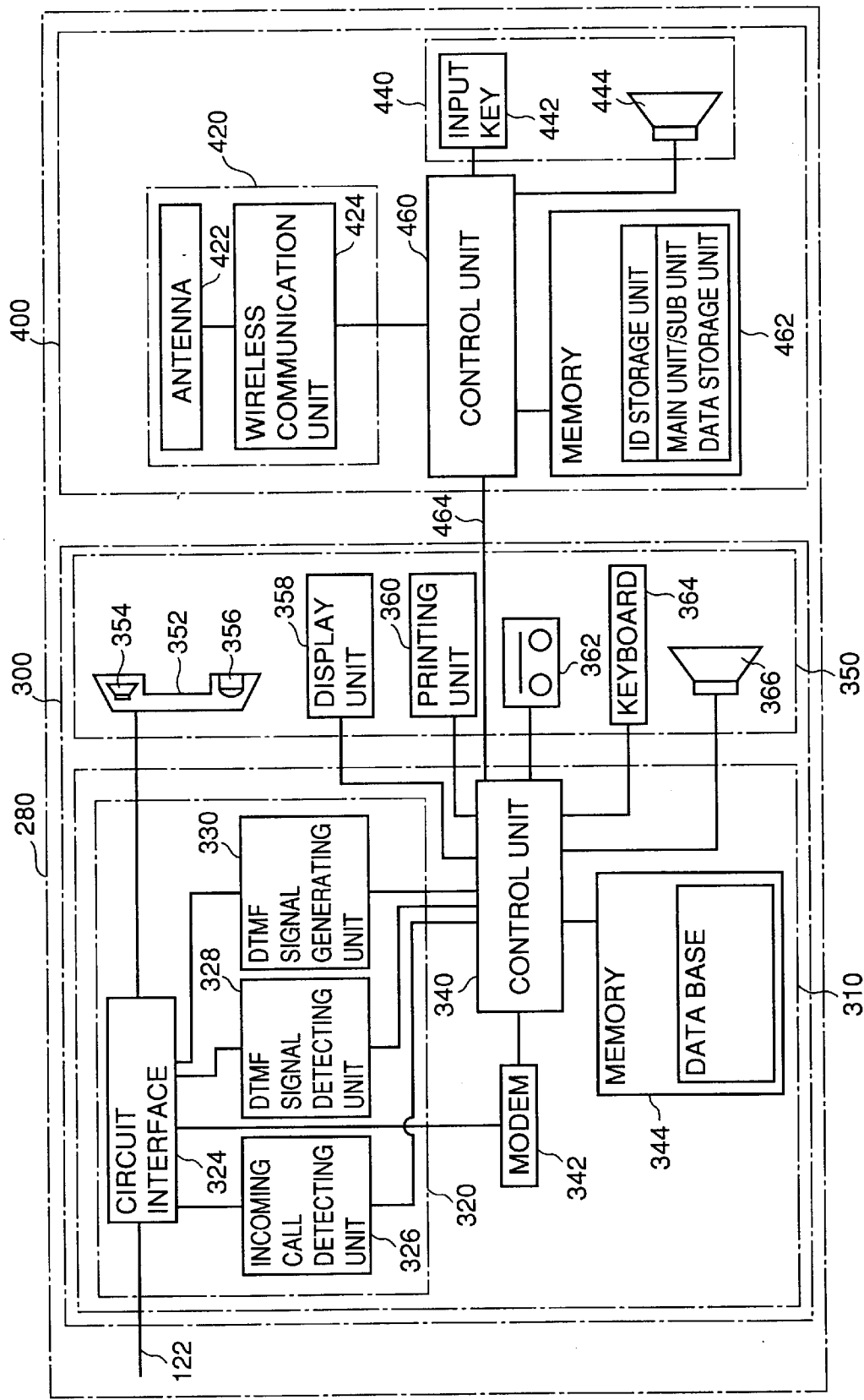
FIG. 4 is a control block diagram of a retail outlet terminal and a setting terminal in accordance with the first embodiment of the present invention.

Referring to FIG. 4, main-sub relation setting apparatus 280 includes a retail outlet terminal 300 connected through telephone circuit 122 to main unit 100, and a setting terminal 400 connected to retail outlet terminal 300 through a connection cable 464 for wireless communication with sub unit 500 that is to be newly connected.

Retail outlet terminal 300 includes: a circuit unit 320 communicating with main unit 100 through telephone circuit 122; an input/output unit 350 connected to circuit unit 320 and control unit 340, outputting a voice received from main unit 100, inputting voice to be transmitted to main unit 100, and outputting a prescribed form; a control unit 340 connected to circuit unit 320 and input/output unit 350 and controlling various portions of retail outlet terminal 300; a memory 344 connected to control unit 340, forming a database and storing data; and a modem 342 connected to control unit 340 and circuit unit 320, for converting digital data stored in memory 344 to analog signals for transmission. Modem 342 can be started or terminated by a control signal from control unit 340. Further, a telephone number of main unit 100 is stored in the database of memory 344, so as to identify the main unit in the process at the retail outlet terminal 300, which will be described later. The telephone number may be stored when the main-sub relation between the main unit 100 and a sub unit 200 at the user's home is set, or it may be stored from the sales information input via the Internet, as will be described later.

Circuit unit 320 includes a circuit interface 324 connected to telephone circuit 122 for capturing and releasing telephone circuit 122; an incoming call detecting unit detecting an incoming signal received through telephone circuit 122; a DTMF signal detecting unit 328 detecting the DTMF signal received from telephone circuit 122 and analyzing the contents thereof; and a DTMF signal generating unit 330 generating the DTMF signal to be output to telephone circuit 122.

Input/output unit 350 includes: a handset 352 connected to circuit interface 324 and including an earpiece 354 converting a voice signal received from main unit 100 to a voice for outputting and a microphone 356 receiving as an input a voice to be transmitted to main unit 100 and converting the voice to a voice signal; a display unit 358 indicating a state of sub unit setting of the sub unit 500 newly connected through setting terminal 400 and displaying a dial number of a call destination; a printer unit 360 connected to control unit 340 for printing an order placement voucher of the new sub unit 500 or a shipping voucher of the new sub unit 500; a hook switch 362 detecting end of a call when the handset 352 is placed on the standby position and detecting start of a call when handset 352 is lift up from the standby position; a keyboard 364 connected to control unit 340 for inputting various data; and a speaker 366 outputting a ringing tone when an incoming signal is received through telephone circuit 122.

Setting terminal 400 includes: a wireless unit 420 communicating with the sub unit 500 to be newly connected; a control unit 460 connected to wireless unit 420 and retail outlet terminal 300 and controlling various portions of setting terminal 400; an input unit 440 connected to control unit 460 for inputting various data; and a memory 462 storing the ID of the main unit received through retail outlet terminal 300 and the like.

Wireless unit 420 includes an antenna 422 for wireless transmission/reception with the sub unit 500 to be newly connected, and a wireless communication unit 424 connected to antenna 422 for demodulating a received signal or modulating a signal to be transmitted. In the wireless communication unit 424, control unit 460 can set a reception channel and a transmission channel.

Input unit 440 includes an input key 442 for inputting various commands, and a speaker 444 for outputting a ringing tone when an incoming signal is received from the newly connected sub unit 500.

Control unit 460 includes a CPU, an ROM, an RAM, an input/output interface and the like, and based on the data input through the input/output interface as well as the programs and data stored in the ROM and RAM, the CPU controls operations of various portions of setting terminal 400. Further, data is transmitted/received between control units 340 and 460 through the input/output interface.

Memory 462 includes an ID storing unit storing the ID of the main unit 100 to which the sub unit 500 is newly connected, and a main unit/sub unit data storing unit storing the sub unit No. of the newly connected sub unit 500.

The program executed by the main unit 100 installed at a user's home has such a control structure as will be described in the following.

When the hook switch 168 detects that handset 162 is off from the standby position and when input of the telephone number through the input key 170 is detected, control unit 180 determines that a call is in process, and starts a telephone call process in the following manner.

It is assumed that a telephone call is made between the user and a retail outlet, and the user orders a sub unit 500 to be newly connected, which corresponds to an existing main unit 100. The sub unit 500 is a dedicated unit or a common unit corresponding to the existing main unit 100.

Figure 5:
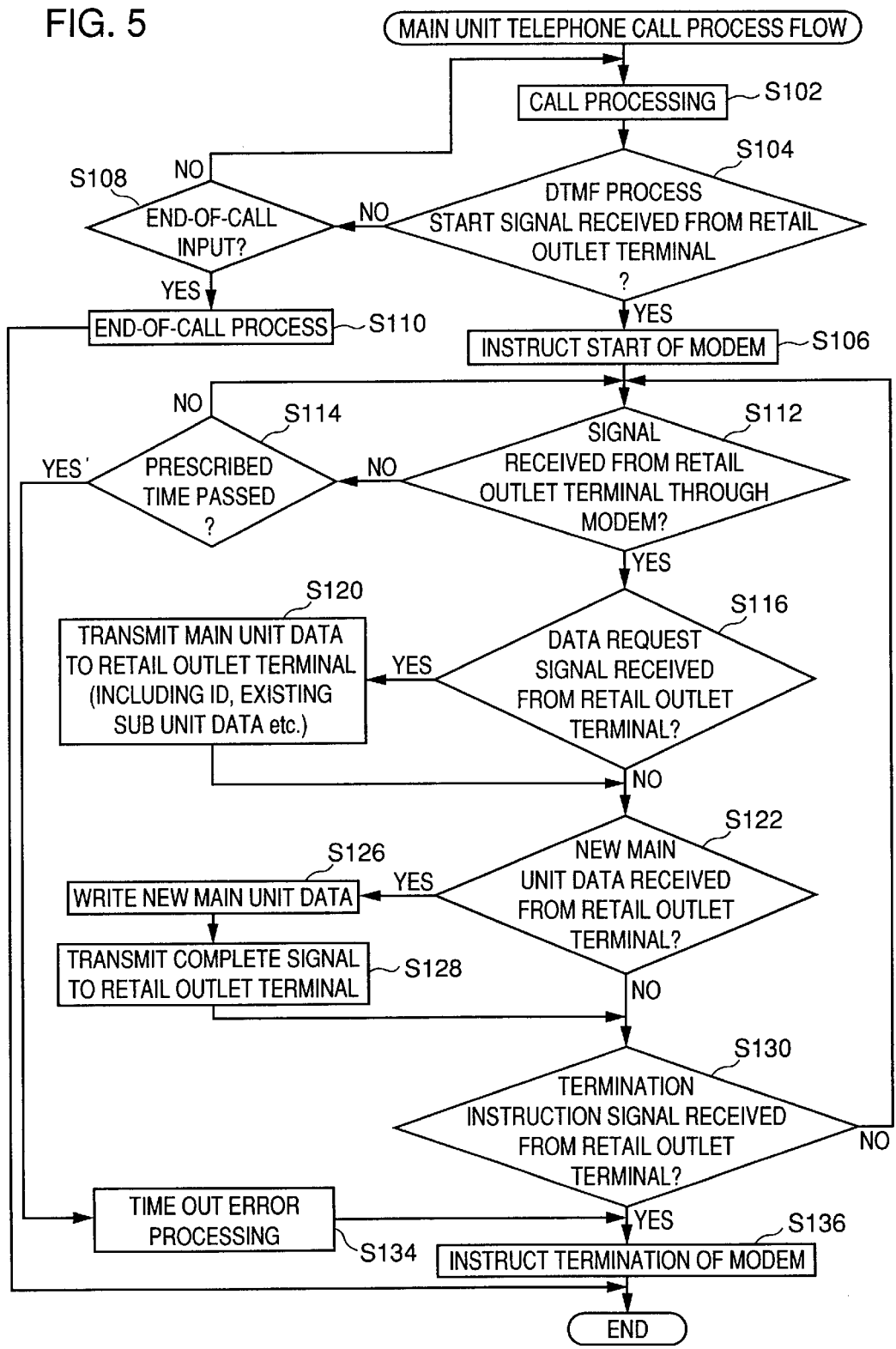
FIG. 5 is a flow chart representing the process of controlling telephone call of a main unit in accordance with the first embodiment of the present invention.

In the following, referring to FIG. 5, the process at the main unit 100 during a telephone call will be described.

In step (hereinafter "step" will be represented by S) 102, general operation of a telephone (for example, on/off of hold function) during telephone call is performed, and in S104, control unit 180 determines whether a DTMF process start signal is received from retail outlet terminal 300 or not. This determination is made based on the result of analysis of the DTMF signal received from retail outlet terminal 300 by the DTMF signal detecting unit 130. When control unit 180 receives the DTMF process start signal from retail outlet terminal 300 (YES in S104), the process proceeds to S106, and control unit 180 issues a modem activation command to modem 182. In response to the activation command, modem 182 is activated. When the DTMF process start signal is not received from retail outlet terminal 300 (NO in S104), the process proceeds to S108.

In S108, control unit 180 determines whether or not there has been an end-of-call input. This determination is made by detecting the on hook state of the hook switch 168 by control unit 180 when the handset 162 is placed back to the standby position, or by detecting pressing of an end-of-call key among the input keys 170. When there is the end-of-call input (YES in S108), the flow proceeds to S110, and in S110, control unit 180 instructs release of the telephone circuit 122, to circuit interface 124, as an end-of-call processing. When there is no end-of-call input (NO in S108), the process returns to S102.

In S122, control unit 180 determines whether or not any signal is received from retail outlet terminal 300 through modem 182 after the activation instruction of modem 182 in S106. When control unit 180 receives a signal from retail outlet terminal 300 through modem 182 (YES in S112), the process proceeds to S116. When no signal is received through modem 182 from retail outlet terminal 300 (NO in S112), the flow proceeds to S114.

In S114, control unit 180 determines whether a prescribed time period has passed or not, based on an internal timer. When the prescribed time has passed (YES in S114), the flow proceeds to S134. If the prescribed time has not yet passed (NO in S114), the flow returns to S112.

In S116, control unit 180 determines whether modem 182 has received a data request signal from retail outlet terminal 300, through telephone circuit 122. When modem 182 receives the data request signal from retail outlet terminal 300 (YES in S116), the process proceeds to S120. If modem 182 does not receive the data request signal from retail outlet terminal 300 (NO in S116), the process proceeds to S122.

In S120, control unit 180 transmits the data stored in memory 184 to retail outlet terminal 300 through modem 182. The data to be transmitted includes the ID of the main unit for specifying the main unit itself, and sub unit identification information (sub unit presence/absence flag, sub unit number information and the like) for identifying sub unit(s) that is already connected to the main unit.

In S122, control unit 180 determines whether or not a new main unit data (data including the sub unit identification information for identifying a sub unit connected to main unit 100, considering the newly connected sub unit 500) has received from retail outlet terminal 300. This determination is made based on whether the new main unit data is received by modem 182 through telephone circuit 122 or not. When the new main unit data is received by the modem 182 from retail outlet terminal 300 (YES in S122), the process proceeds to S126. When modem 182 does not receive the new main unit data from retail outlet terminal 300 (NO in S122), the process proceeds to S130.

In S126, control unit 180 stores the new main unit data received in S122 in the main unit data storing unit of memory 184. In S128, control unit 180 transmits a complete signal to retail outlet terminal 300 through modem 182 and telephone circuit 122.

In S130, control unit 180 determines whether a termination instruction signal is received from retail outlet terminal 300 or not. This determination is made based on whether the modem 182 received the termination instruction signal or not, through telephone circuit 122. When modem 182 receives the termination instruction signal from retail outlet terminal 300 (YES in S130), the process proceeds to S136. When modem 182 does not receive the termination instruction signal from retail outlet terminal 300 (NO in S130), the process proceeds to S112.

When it is determined in S114 that the prescribed time period has passed, a time out error process takes place in S134.

In S136, control unit 180 issues a modem termination instruction to modem 182.

Though communication between the main unit 100 and retail outlet terminal 300 is implemented by using the DTMF signal and the modem, communication may be implemented only by the DTMF signal.

Though a user orders a new sub unit 500 by a telephone conversation with a salesperson in the above described example, a recorded message reproducing apparatus may be provided in the retail outlet terminal 300, so that in accordance with the voice message guidance generated by the recorded message reproducing apparatus, a user may operate an input key 170, transmit the generated DTMF signal to the retail outlet terminal, and the signal is identified by the retail outlet terminal, enabling purchase of a new sub unit 500.

Figure 6:
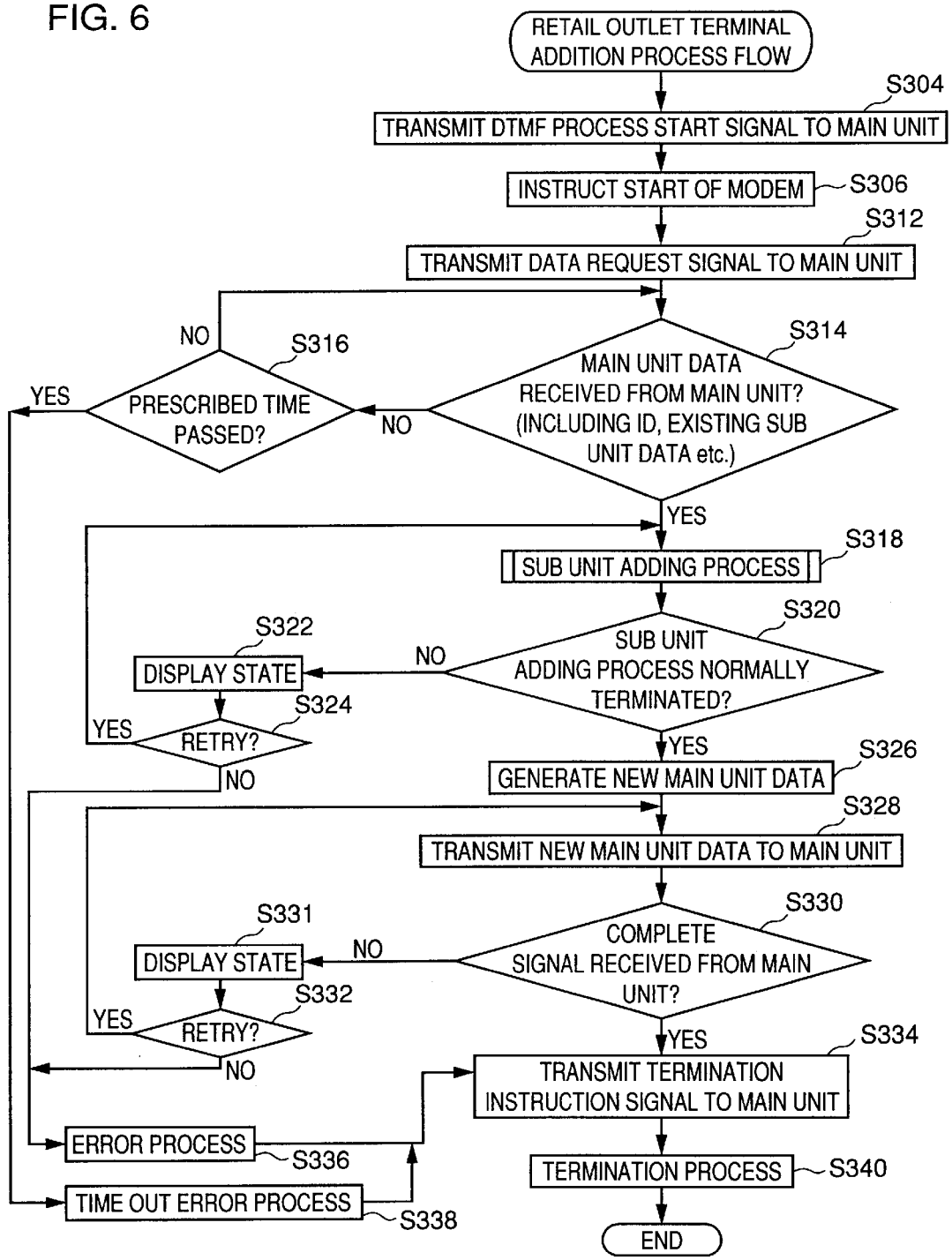
FIG. 6 is a flow chart representing the flow of control of an expansion process at a retail outlet terminal in accordance with the first embodiment of the present invention.

Referring to FIG. 6, the program executed by the retail outlet terminal 300 of the main-sub relation setting apparatus 280 has the following control structure.

Control unit 340 of retail outlet terminal 300 performs a normal operation as a telephone, and a telephone call process is performed between main unit 100 and retail outlet terminal 300. As described above, it is assumed that by this telephone call, a user orders a new sub unit 500 to be connected to the existing main unit 100. When a salesperson instructs addition of a sub unit using the keyboard 364 in accordance with the order, or when the order over the Internet is confirmed, as will be described later, the process shown in FIG. 6 is executed.

In S304, control unit 340 transmits a DTMF process start signal to main unit 100. At this time, the DTMF signal is a code representing the start of processing, control unit 340 generates a corresponding code at DTMF signal generating unit 330, and transmits the code through circuit interface 324 and telephone circuit 122 to main unit 100.

In S306, control unit 340 issues an instruction of activation to modem 342. In S312, after the activation of modem 342, control unit 340 transmits a data request signal to main unit 100.

In S314, control unit 340 determines whether the main unit data is received from main unit 100. As already described, the main unit data includes the ID for specifying the main unit 100 itself, and the sub unit identifying information (sub unit presence/absence flag, sub unit number information and the like) for identifying sub unit(s) already connected to the main unit. This determination is made based on whether the main data is received by the modem 342 through telephone circuit 122 or not. When modem 342 receives the main unit data from main unit 100 (YES in S314), the process proceeds to S318. When modem 342 does not receive the main unit data from main unit 100 (NO in S314), the process proceeds to S316.

In S316, control unit 340 determines whether a prescribed time period has passed or not, by an internal timer. When the prescribed time has passed (YES in S316), the process proceeds to S338. Until the prescribed time passes (NO in S316), the process returns to S314, waiting for reception of the main unit data from main unit 100.

In S318, control unit 340 performs the process for adding the sub unit 500 to be newly connected. Details of the sub unit adding process will be described later.

In S320, control unit 340 determines whether the process for adding sub unit 500 has successfully terminated or not. This determination is made based on a control command (details of which will be described later) in a wireless communication between setting terminal 400 and sub unit 500, received from setting terminal 400. When the process for adding the new sub unit 500 is successfully terminated (YES in S320), the process proceeds to S326. If the process for adding the sub unit 500 has not terminated successfully (NO in S320), the process proceeds to S322.

In S322, control unit 340 displays the state of the process for adding sub unit 500 received from setting terminal 400, on display unit 358. After the process of S322, control unit 340 determines whether the process for adding a sub unit is to be performed again. This determination may be made dependent on whether a retry command is input through keyboard 364 or not, or the determination is made in accordance with a condition that retry should be made until a predetermined number of retries is reached and a retry will not be made once the predetermined number of retries has been reached. When it is determined that a retry should be made (YES in S324), the process proceeds to S318. If no retry is to be made, (NO in S324), the process proceeds to S336.

In S326, control unit 340 generates a new main unit data to be transmitted to main unit 100. The new main unit data includes the sub unit identification information identifying the newly added sub unit. The sub unit identification information included in the new main unit information is generated based on the sub unit identification information identifying the sub unit(s) already connected to the main unit, received in S314. When the sub unit identifying information is a sub unit presence/absence flag, then based on the data "10000000" stored as the sub unit identifying information (representing that there is an existing sub unit as sub unit No.1), a sub unit identifying information "10010000" is generated when a second sub unit is newly added (representing that there are two sub units, that is, sub unit Nos. 1 and 4). When the sub unit identifying information is the sub unit number information, then based on the sub unit number information stored in the main unit storing unit of memory 184 of main unit 100, the sub unit identifying information having the number of newly connected sub unit(s) added to the number of existing sub units is generated.

In S328, control unit 340 transmits the new main unit data through modem 342, circuit interface 324 and telephone circuit 122 to main unit 100.

In S330, control unit 340 determines whether a complete signal is received from main unit 100. This determination is made based on whether the complete signal is received by the modem 342 through telephone circuit 122 and circuit interface 324. When modem 342 receives the complete signal from main unit 100 (YES in S330), the process proceeds to S334. When the modem 342 does not receive the complete signal from main unit 100 (NO in S330), the process proceeds to S331 and S332. The processes of S331 and S332 are the same as those of S322 and S324, and therefore, detailed description thereof will not be repeated here.

If it is determined that the time has passed in S316 (YES in S316), a time out error process is performed in S338. If it is determined in S324 or S332 that a retry should not be made, an error process is performed in S336.

After the error process in S336 and the time out error processing in S338, the process proceeds to S334.

In S334, control unit 340 transmits a termination instruction signal to main unit 100 and, thereafter, in S340, control unit 340 performs the termination process. In the termination process, control unit 340 controls the display unit 358 such that it displays a termination indication or error indication, or controls the printing unit 360 such that it prints and outputs an order placement voucher or a shipping voucher.

Figure 7:
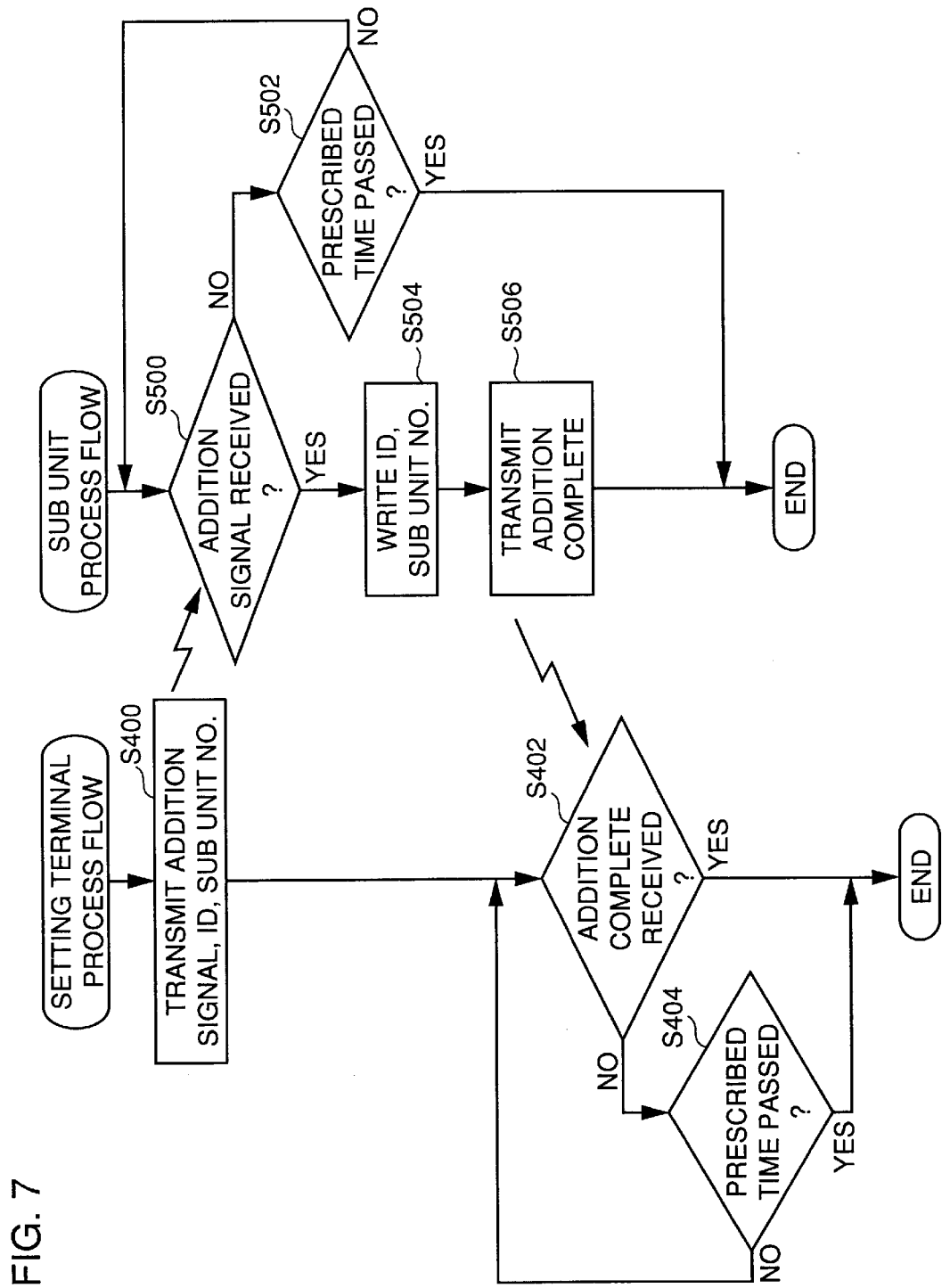
FIG. 7 is a flow chart showing the flow of control of an expansion process at the setting terminal and a new sub unit, in accordance with the first embodiment of the present invention.

Referring to FIG. 7, the program executed by setting terminal 400 of main-sub relation setting apparatus 280 has the following control structure.

In S400, the control unit 460 of setting terminal 400 transmits data such as ID, sub unit No. and an addition signal to sub unit 500 to be newly added. Here, the ID and the sub unit No. are generated based on the data received by retail outlet terminal 300 from main unit 100. As to the sub unit No. as the sub unit information, examples when the sub unit identifying information is a sub unit presence/absence flag and when the information is the sub unit number information, will be described.

When the sub unit identifying information is a sub unit presence/absence flag, then, based on the sub unit presence/absence flag stored in the main unit storing unit of memory 184 of main unit 100, a flag for which an existing sub unit is not registered is transmitted as the sub unit No. to sub unit 500 to be newly connected. For example, based on a sub unit presence/absence flag "10000000" (representing that there is an existing sub unit as sub unit No. 1) of a main unit to which up to 8 sub units can be connected, the sub unit identification information "10010000" considering the new sub unit is generated (representing that sub units are connected as sub unit Nos. 1 and 4). Here, the second sub unit that is to be newly connected has the sub unit information (unit No.) of 4. Here, the sub unit information of the newly connected sub unit may be designated, or sub unit information corresponding to an empty flag may automatically be selected.

When the sub unit identifying information is the sub unit number information, then based on the sub unit number information stored in the main unit storing unit of memory 184 of main unit 100, a value obtained by adding the number of newly connected sub unit(s) to the number of existing sub unit(s) (in this embodiment, the value is 2, as only one sub unit 500 is newly added to existing one sub unit) is transmitted as the sub unit information (unit No.) to the newly connected sub unit 500. Here, the method of calculating the sub unit information of the sub unit newly connected is not limited to addition of 1 to the number of units.

The addition number, ID and sub unit No. transmitted in S400 are read from main unit/sub unit data storing unit of memory 462 of setting terminal 400.

In S402, control unit 460 determines whether an addition complete signal is transmitted from the newly added sub unit 500 through wireless unit 420 or not. When control unit 460 receives the addition complete signal from the newly connected sub unit 500 (YES in S402), the process proceeds to S406. If this procedure terminates, it is determined in S320, which is already described, that the process is successfully terminated. When the addition complete signal is not received from the newly added sub unit 500 (NO in S402), the process proceeds to S404.

In S404, control unit 460 determines whether a prescribed time has passed or not by an internal timer. When the prescribed time period has passed (YES in S404), the process is terminated. When the process terminates in this manner, it is determined in S320, which is described above, that the process is not successfully terminated. Until the prescribed time passes (NO in S404), the process proceeds to S402.

In S402, when control unit 460 receives the addition complete signal from the newly added sub unit 500 through wireless unit 420, it is possible to generate the new main unit data to be written to main unit 100. For example, the new main unit data may be data including, in addition to the sub unit specifying information described above, information representing whether the newly connected sub unit is a common sub unit or a dedicated sub unit.

Referring to FIG. 7, the program executed by the newly connected sub unit 500 has the following control structure.

In S500, control unit 560 determines whether an addition signal is received from setting terminal 400 through wireless unit 520 or not. When control unit 560 receives the addition signal in response to the process of S400 described above (YES in S500), the process proceeds to S504. When the addition signal is not received (NO in S500), the process proceeds to S502.

In S502, control unit 560 determines whether a prescribed time period has passed or not by an internal timer. Until the prescribed time passes (NO in S502), the process returns to S500, waiting for the addition signal from setting terminal 400. When the prescribed time passed (YES in S502), the process terminates.

In S504, control unit 560 receives the ID and the sub unit No. received in S500 in the ID storing unit and the sub unit data storing unit of memory 562.

In S506, control unit 560 transmits the addition complete signal to setting terminal 400.

Figure 8:
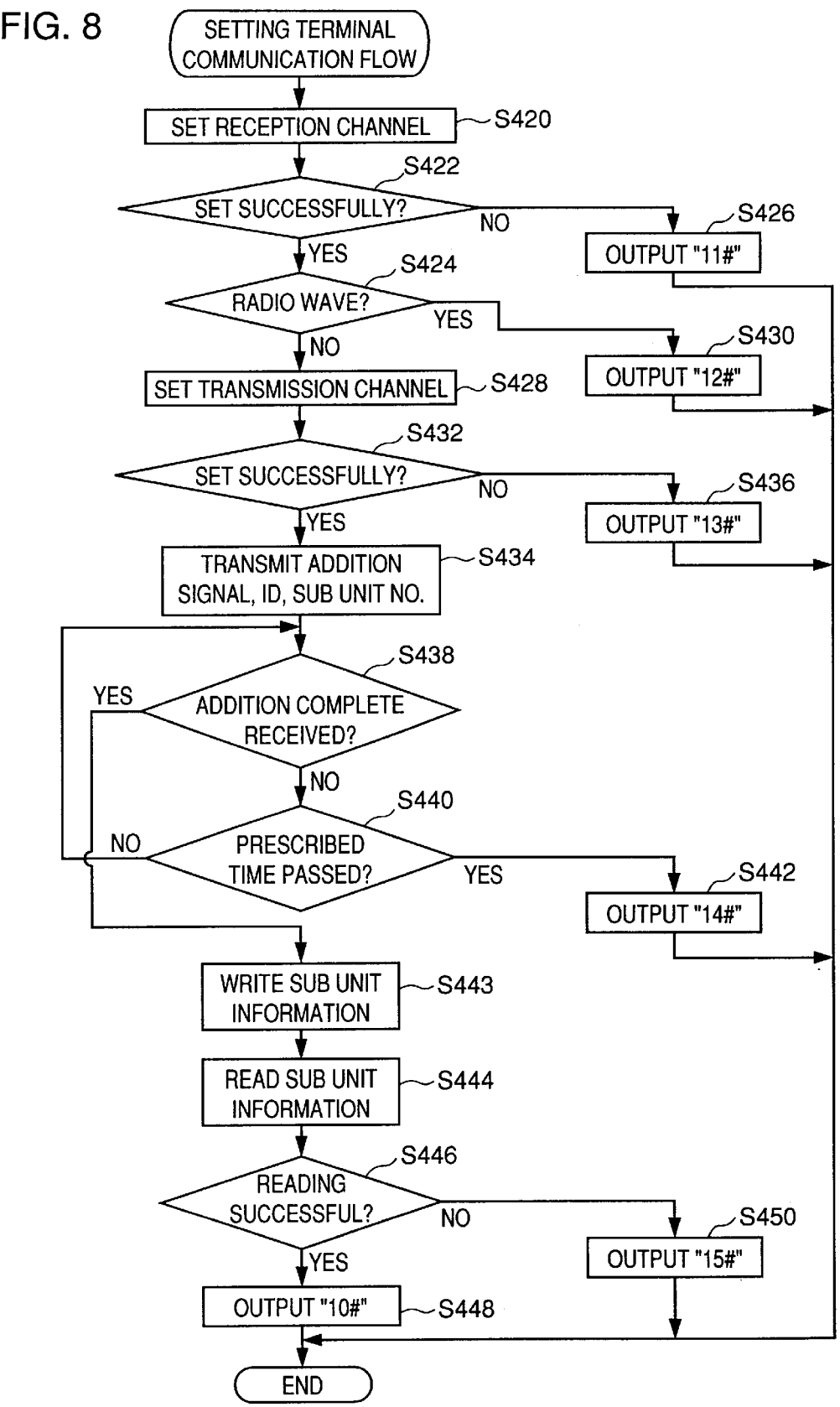
FIG. 8 is a flow chart representing the flow of control of a communication process at the setting terminal in accordance with the first embodiment of the present invention.

Referring to FIG. 8, the program executed by setting terminal 400 in the communication processing between the setting terminal 400 of main-sub relation setting apparatus 280 and the newly connected sub unit 500 has the following control structure.

Here, the causes of unsuccessful adding process of the new sub unit 500 and control commands output to connection cable 464 corresponding to the causes are defined as follows.

10#: addition successful.

11#: reception channel of wireless communication unit 424 cannot be set.

12#: there is a radio wave on the channel used for the adding process (as the setting between other main unit and other sub unit is occupying the channel, the channel is not available).

13#: a transmission channel for wireless communication unit 424 cannot be set.

14#: an addition complete signal cannot be received from sub unit 500.

15#: after the information related to sub unit in memory 462 of setting terminal 400 is rewritten, the rewritten information is read, and the data is not correctly rewritten (memory failure).

In S420, control unit 460 selects a channel used for the addition process, from the reception channels of wireless communication unit 424.

In S422, control unit 460 determines whether the channel of wireless communication unit 424 is correctly set or not. When the channel used for the addition process is set (YES in S422), the process proceeds to S424. When the channel to be used for the addition process cannot be set (NO in S422), the process proceeds to S426, and control unit 460 outputs the control command "11#" to connection cable 464.

In S424, control unit 460 determines whether there is a radio wave on the reception channel set in S420. When there is no radio wave on the reception channel (NO in S424), the process proceeds to S428. When there is a radio wave on the reception channel set in S420 (YES in S424), the process proceeds to S430, and control unit 460 outputs the control command "12#" to connection cable 464.

In S428, control unit 460 sets a transmission channel used for the addition process for wireless communication unit 424.

In S432, control unit 460 determines whether the transmission channel of wireless communication unit 424 is set or not. When the transmission channel is set (YES in S432), the process proceeds to S434. When the transmission channel cannot be set (NO in S432), the process proceeds to S436, and control unit 460 outputs the control command "13#" to connection cable 464.

In S434, control unit 460 transmits the addition signal, and the ID and the sub unit No. stored in memory 462, to the sub unit 500 to be newly added.

In S438, control unit 460 determines whether the addition complete signal is received from the newly connected sub unit 500 through wireless unit 420. When control unit 460 receives the addition complete signal (YES in S438), the process proceeds to S443. When the addition complete signal is not received (NO in S438), the process proceeds to S440.

In S440, control unit 460 determines whether a prescribed time period has passed or not by an internal timer. Until the prescribed time passes (NO in S440), the process returns to S438, waiting for reception of the addition complete signal. When the prescribed time period has passed (YES in S440), the process proceeds to S442, and control unit 460 outputs the control command "14#" to connection cable 464.

In S443, setting terminal writes the information related to the sub unit in memory 462, and the process proceeds to S444. In S444, control unit 460 reads the information (ID, sub unit No.) written in S443 and stored in memory 462.

In S446, control unit 460 compares the information read in S444 with the information written in S443, and determines whether the read information is correct. If the data is correct (YES in S446), the flow proceeds to S448, and control unit 460 outputs the control command "10#" to connection cable 464. If the data is not correct (NO in S446), the process proceeds to S450, and control unit 460 outputs the control command "14#" to connection cable 464. Alternatively, the data may be confirmed by the sub unit, by reading the information written in the adding process and comparing the read information with the information instructed by setting terminal 400.

The operations of retail outlet terminal 300 and setting terminal 400 of main-sub relation setting apparatus 280, main unit 100 and sub unit 500 to be newly connected, based on the structures and the flow charts described above, are as follows. In the following description, it is assumed that a user already has a main unit 100 and a sub unit 200, and that in order to purchase a new sub unit 500, the user makes an order, by telephone, using main unit 100, to a retail outlet terminal 300 of main-sub relation setting apparatus 280 installed in the retail outlet.

Operations of Main Unit 100 and Retail Outlet Terminal 300.

User lifts the hand set 162 of main unit 100 at his home from the standby position, inputs dial number of retail outlet terminal 300 through input key 170, and calls the retail outlet terminal 300.

Retail outlet terminal 300 and main unit 100 are connected by telephone circuit 122. In this telephone conversation, the user places an order for the purchase of a sub unit 500 to be newly connected, to a salesperson.

When the order to purchase the new sub unit 500 is placed, the salesperson takes the sub unit 500 and performs prescribed input through the keyboards, so that retail outlet terminal 300 transmits a DTMF process start signal to main unit 100 (S304). Main unit 100 receives the DTMF process start signal from retail outlet terminal 300 (YES in S104). Control unit 180 of main unit 100 activates modem 182 (S106).

Control unit 340 of retail outlet terminal 300 activates modem 342 (S306). Retail outlet terminal 300 transmits a data transmission request signal to main unit 100 (S312), and main unit 100 receives the data request signal from retail outlet terminal 300 (YES in S112, YES in S116). Main unit 100 transmits the main unit data to retail outlet terminal 300 (S120). The retail outlet terminal 300 receives the main unit data from main unit 100 (YES in S314). After the main unit data is received from main unit 100, retail outlet terminal 300 performs the process for adding the sub unit (S318).

When the process for adding a sub unit terminates successfully (YES in S320), retail outlet terminal 300 prepares the new main unit data including the newly connected sub unit 500 (S362), and transmits the new main unit data to main unit 100 (S328).

When the new sub unit data is received from retail outlet terminal 300 (YES in S122), main unit 100 writes the received new sub unit data to main unit data storing unit of memory 184 (S126), and transmits a complete signal to retail outlet terminal 300 (S128).

When the complete signal is received from main unit 100 (YES S330), retail outlet terminal 300 transmits a termination instruction signal to main unit 100 (S334), displays an end display on display unit 358 (S340), and the process at the retail outlet terminal 300 is completed.

Main unit 100 receives the termination instruction signal from retail outlet terminal 300 (YES in S130), instructs turn off of modem 182 (S136), and the process by the main unit 100 is completed.

In the retail outlet terminal 300, as the termination process in S340, a shipment slip of the new sub unit 500 purchased by the user through the telephone circuit 122 may be printed by the printing unit 360. The salesperson can ship the sub unit 500 for which the main-sub relation has been set, with the printed shipment voucher adhering thereto. When the sub unit 500 is delivered to the user, it is possible for the user to use the sub unit without any further setting, as the main-sub relation is already set in the sub unit.

Operations of Setting Terminal 400 and Newly Connected Sub Unit 500

Based on the ID and the number of existing sub unit(s) received from main unit 100 by retail outlet terminal 300, setting terminal 400 performs the process for adding the new sub unit 500.

In S400, the setting terminal 400 transmits the ID, the addition signal and the sub unit No. to sub unit 500 to be newly connected. The sub unit 500 to be newly connected receives the addition signal (YES in S500).

Based on the addition signal received in S500, sub unit 500 writes the received ID and the sub unit No. in memory 562 (S504). Thereafter, it transmits an addition complete signal to setting terminal 400 (S506). The setting terminal 400 receives the addition complete signal (YES in S402).

When the addition signal is not received before a prescribed time period has passed at sub unit 500, the process is terminated forcibly. When the addition complete signal is not received by the setting terminal 400 within a prescribed time period, the process is forcedly terminated.

The operation for the process for adding the sub unit at the setting terminal 400 is as follows.

At the setting terminal 400, in order to establish communication with sub unit 500 to be newly added, a reception channel is set (S420) and a transmission channel is set (S428).

At this time, when the reception channel cannot be set (NO in S422), control unit 460 of setting terminal 400 transfers the control command "11#" through connection cable 464 to control unit 340 of retail outlet terminal 300 (S426). When the transmission channel cannot be set (NO in S432), Similarly, the control command "13#" is transferred by control unit 340. When there is a radio wave on the set reception channel, the control command "12#" is transferred by control unit 340 (S430).

When the reception channel and the transmission channel are set normally, setting terminal 400 transmits the addition signal, the ID and the sub unit No. to sub unit 500 (S434). When the addition complete signal is not received within a prescribed time period (YES in S440), the control command "14#" is transferred from control unit 460 through connection cable 464 to control unit 340.

The setting terminal 400 receives the addition complete signal (YES in S438) and the information written in the setting terminal does not correspond to the read information (NO in S446), the control command "15#" is transmitted from control unit 460 through connection cable 464 to control unit 340.

When the addition process is done normally (YES in S446), the control command "10#" is transferred from control unit 460 through connection cable 464 to control unit 340.

Based on the control command signals "10#" to "15#" transferred from control unit 460 of setting terminal 400 through connection cable 464 to control unit 340 of retail outlet terminal 300 and on the contents of error corresponding to the control command stored in the data base of memory 344, the contents of the error are displayed on display unit 358.

In this manner, in the main-sub relation setting apparatus in accordance with the present invention, it is possible by the retail outlet terminal 300 included in main-sub relation setting apparatus 280, to read the ID and the sub unit No. information stored in the memory 184 of main unit 100, and based on the information, it is possible to generate the sub unit information for the sub unit to be newly connected, and by the setting terminal 400, it is possible to store the ID and the sub unit No. to memory 562 of the sub unit 500 to be newly connected. As a result, a main-sub relation setting apparatus 280 is provided which enables a salesperson to perform the process for adding the new sub unit 500, when a user has a main unit of a cordless telephone system, for example, including a plurality of sub units at the user's home.

Second Embodiment

Figure 9:
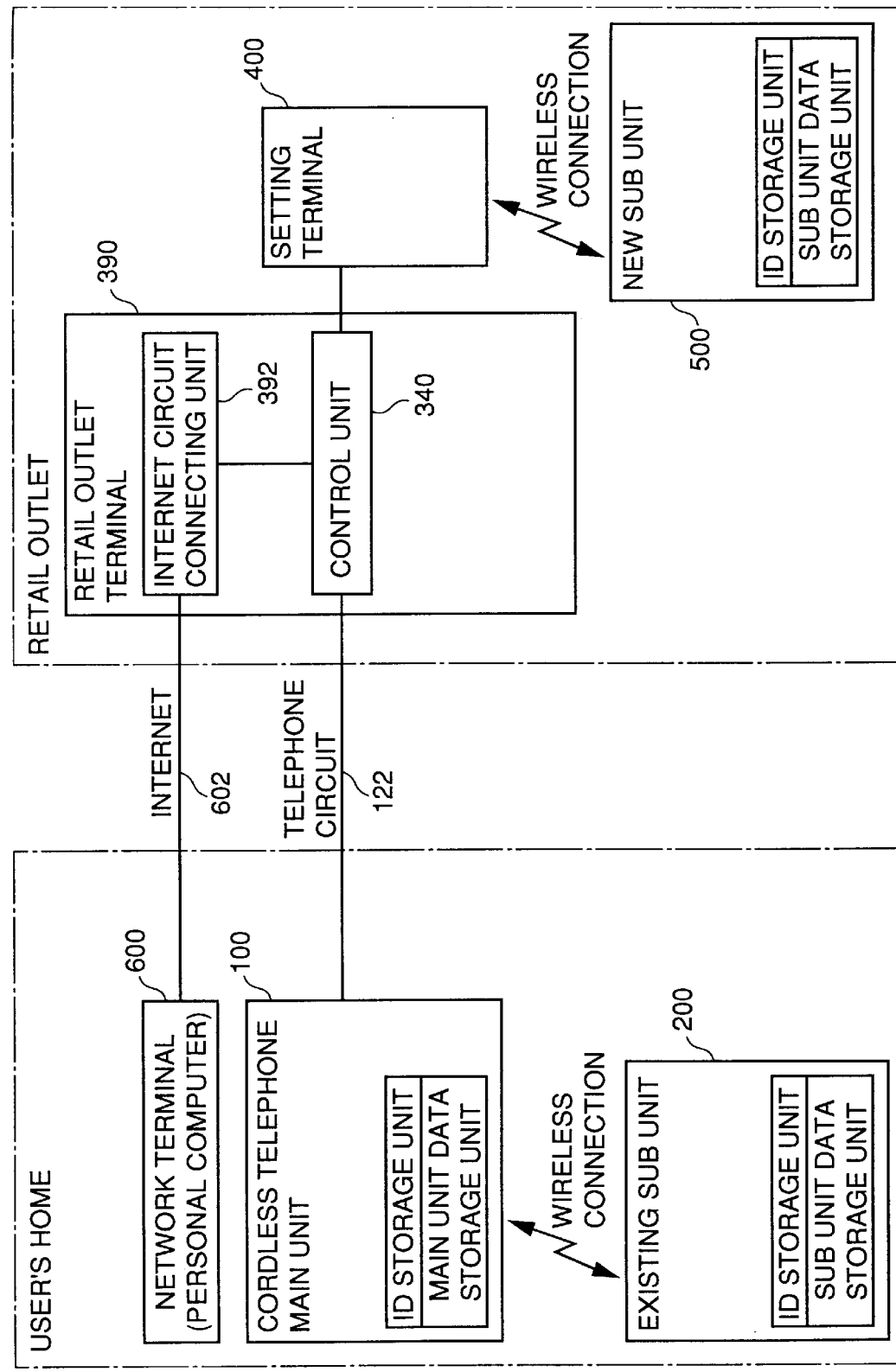
FIG. 9 shows a state of connection between the main-sub relation setting apparatus and a cordless telephone system in accordance with the second embodiment of the present invention.

Referring to FIG. 9, a retail outlet terminal 390 of the main-sub relation setting apparatus in accordance with the present embodiment includes an internet circuit connecting unit 392 connected to the Internet circuit 602 and control unit 340. Other hardware configurations are the same as those of the first embodiment, and therefore detailed description thereof will not be repeated here. It is assumed that a network terminal (for example, a personal computer) 600 that is connected through the internet circuit, to the internet circuit connecting unit 392 of retail outlet terminal 390 is installed at the user's home.

Figure 10:
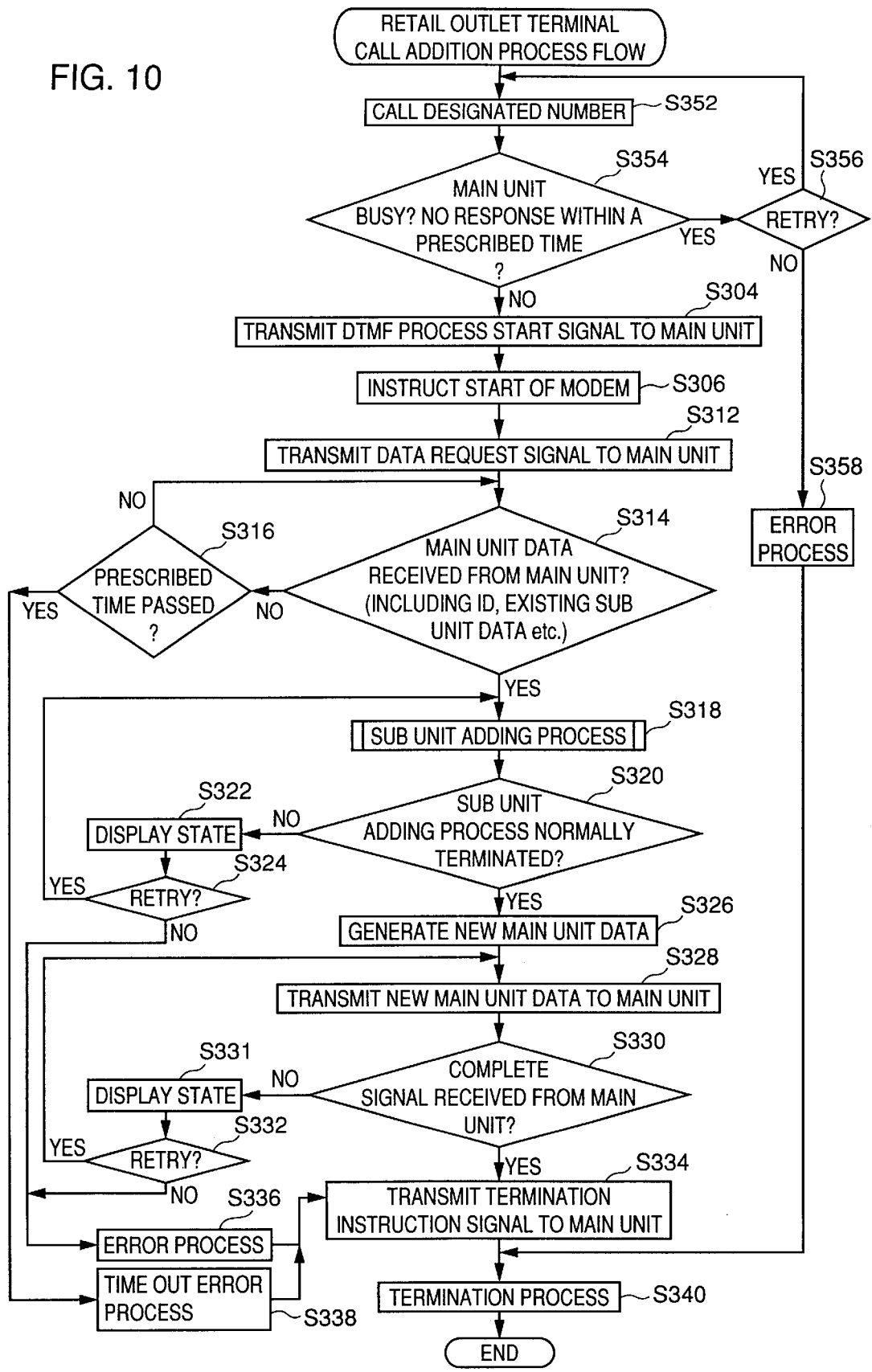
FIG. 10 is a flow chart representing the flow of control of a call addition process at a retail outlet terminal in accordance with the second embodiment of the present invention.

Referring to FIG. 10, the program executed by retail outlet terminal 390 in accordance with the present embodiment has the following control structure. In the following, the contents of S304 to S340 are the same as those described with reference to FIG. 6 above, and therefore detailed description will not be repeated here.

The following description is given assuming that a user connects the network terminal 600 at home to the internet circuit connecting unit 392 of a retail outlet terminal 390 by the Internet circuit 602, and that the user places an order to purchase a new sub unit 500 through the Internet circuit 602. When the user places an order for the new sub unit 500 through the Internet circuit 602, the user inputs the telephone number of the main unit 100.

When a call instruction to call a telephone number of the main unit 100 of the user purchasing the new sub unit (the number input by the user through internet circuit 602) is issued from internet circuit connecting unit 392, control unit 340 performs the process shown in FIG. 10.

In S352, control unit 340 performs a call process based on the designated number input as the telephone number of the main unit, by the user through Internet circuit 602.

In S354, control unit 340 determines whether the main unit 100 of the called party, to which a call is made in accordance with the designated number through telephone circuit 122, is busy or not. When the main unit 100 is busy (YES in S354), the process proceeds to S356. When the main unit 100 is not busy and there is a response (NO in S354), the process proceeds to S304.

In S356, control unit 340 determines whether a retry of a call should be made or not. This determination is made in accordance with a condition that retry should be made up a predetermined retry number and any retry is not made when the predetermined number of retries is reached. When the retry is to be made (YES in S356), the process returns to S352, and if retry should not be made (NO in S356), the process proceeds to S358, in which error processing is performed and the process is terminated forcedly.

Further, expecting return of the base unit 500 sold through the Internet circuit 602, a data base is formed in the data base of the memory 344, which data base stores the model number and the serial number of sub unit 500 and the telephone number of main unit 100 for which the main-sub relation is registered. Based on the product number and the serial number of the returned sub unit 500, it is possible to specify the main unit 100, to make a call from the retail outlet terminal 390 to main unit 100, and to cancel the registration information of the main-sub relation stored in the memory 184 of main unit 100.

In this manner, by the retail outlet terminal 390 of the main-sub relation setting apparatus 280 in accordance with the present invention, it is possible for a salesperson of the retail outlet to set the main-sub relation, for the new sub unit 500 to be newly connected, of which order is placed through the internet circuit.

Third Embodiment

Figure 11:
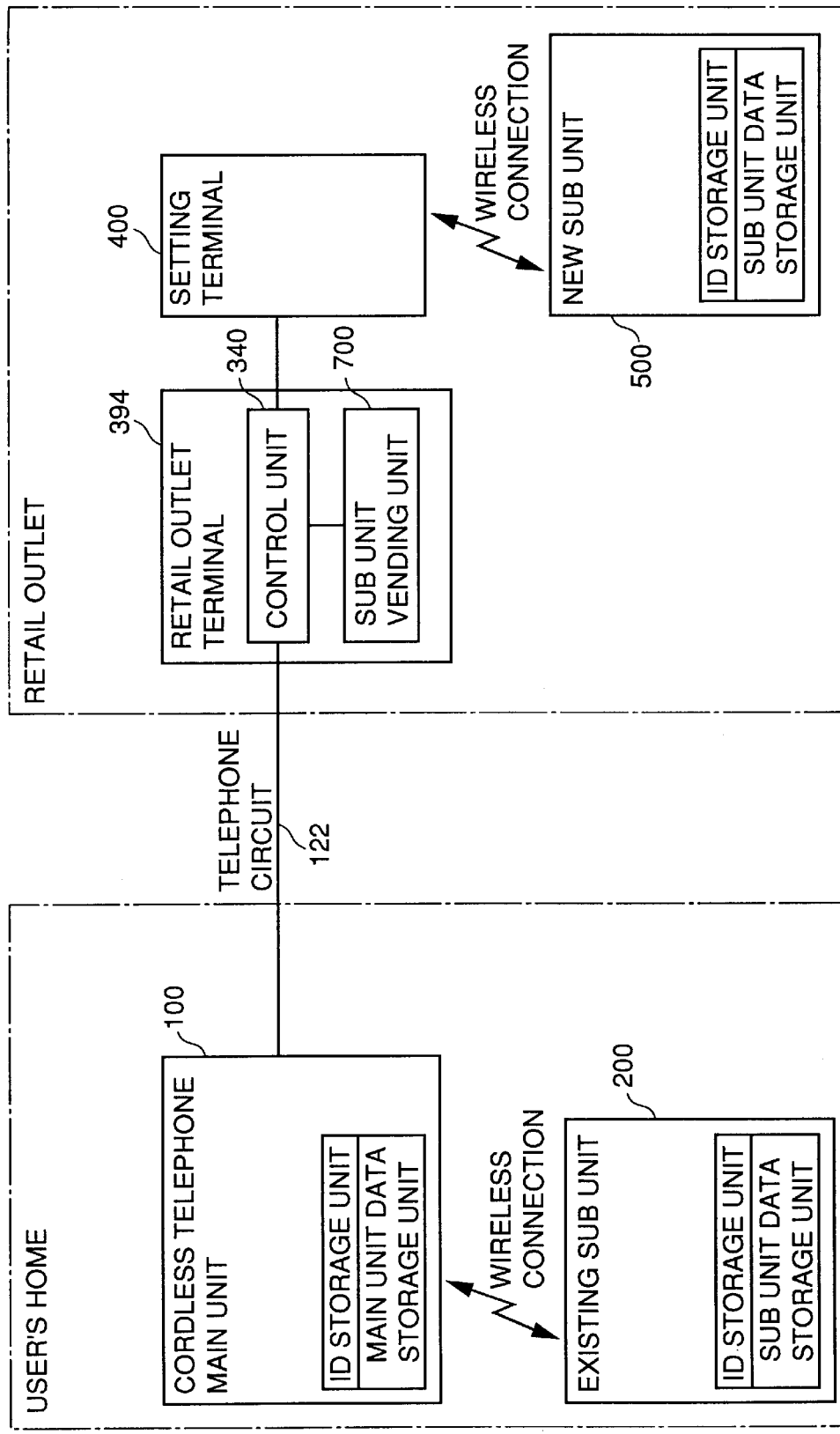
FIG. 11 shows the state of connection between the main-sub relation setting apparatus and the cordless telephone system in accordance with the third embodiment of the present invention.
Figure 12:
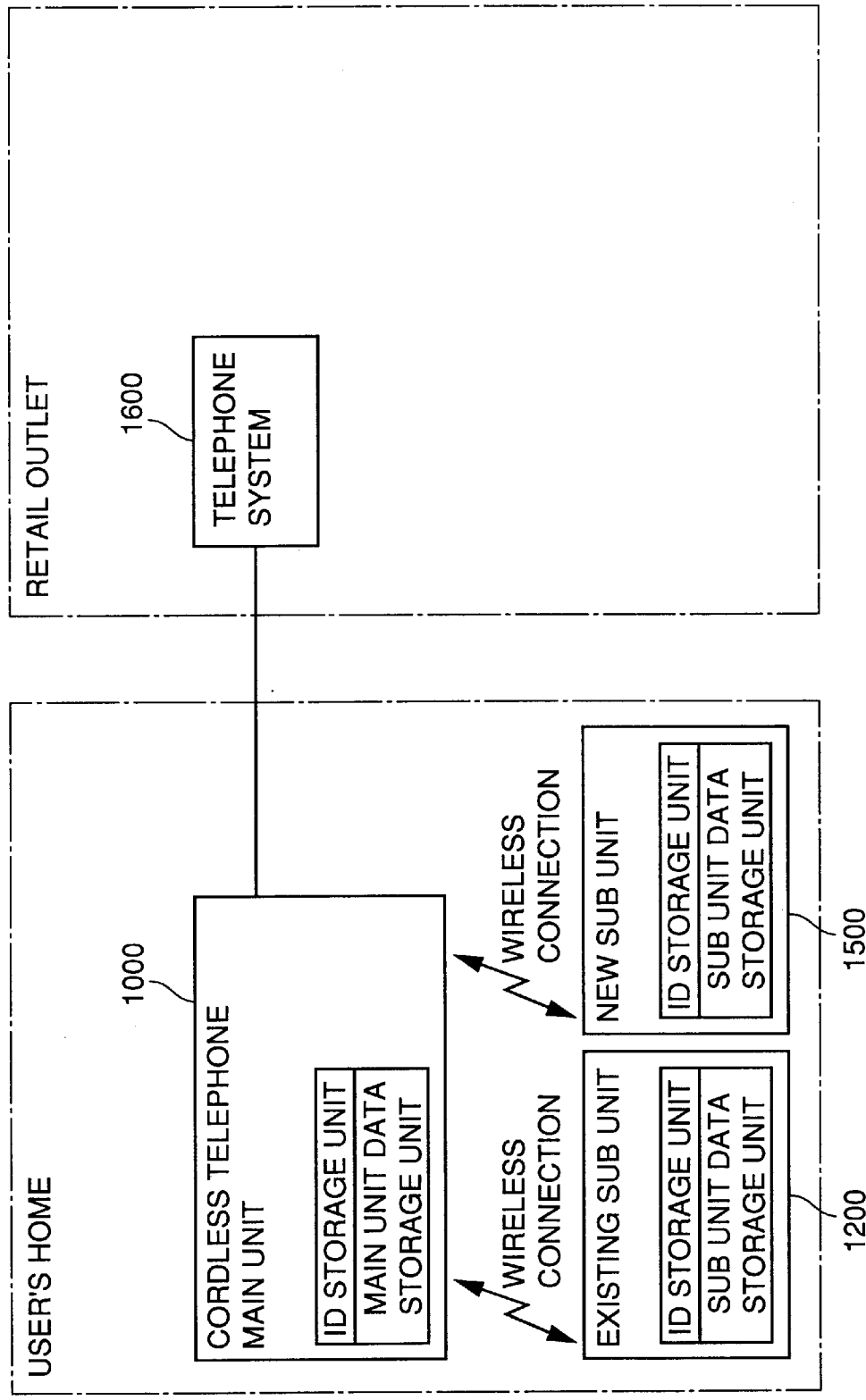
FIG. 12 shows the state of connection of a conventional cordless telephone system.

Referring to FIG. 11, retail outlet terminal 394 of the main-sub relation setting apparatus in accordance with the present invention includes a sub unit vending unit 700 connected to control unit 340. Other hardware configurations are the same as those of the first embodiment described above, and therefore, detailed description thereof will not be repeated.

The main-sub relation setting apparatus in accordance with the present embodiment is used when a user visits a retail outlet where the main-sub relation setting apparatus is installed, and purchases a sub unit 500 to be newly connected to a main unit 100 at home, by using the sub unit vending unit 700 of retail outlet terminal 394.

The sub unit vending unit 700 has, for example, a shape of an automatic vendor, including a selection display unit on which various sub units are displayed and allowing selection of the sub unit; a telephone number input unit to input the telephone number of main unit 100 of the user, and a payment unit for receiving the money for the sub unit 500.

When the user selects a desirable sub unit 500, inputs the telephone number of the main unit 100 at the user's home and pay the money at the sub unit vending unit 700, the user can receive the desired sub unit 500.

When the sub unit 500 is newly purchased by the sub unit vending unit 700, based on the telephone number of the main unit input by the user, the control unit 340 of retail outlet terminal 394 issues a call instruction to main unit 100 (S352 of FIG. 10). The program executed by retail outlet terminal 394 in accordance with the present embodiment is the same as the process flow chart of the second embodiment (FIG. 10) described above. Therefore, detailed description thereof is not repeated here.

The present embodiment differs from the second embodiment in that the telephone number of main unit 100 is input through the Internet circuit 602 in the second embodiment, while the telephone number of main unit 100 is directly input by the user through the telephone number input unit of sub unit vending unit 700 of retail outlet terminal 394 in the third embodiment.

In this manner, by the main-sub relation setting apparatus in accordance with the present invention, when the user purchases a sub unit from a sub unit vending unit 700 at the retail outlet, it is possible to set the sub unit 500 to be newly connected, as the retail outlet terminal 394 automatically calls the main unit 100 when the user inputs the telephone number of main unit 100.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A main-sub relation setting apparatus, for setting main-sub relation of electric appliances including a main unit and one or more handset sub units connected to said main unit, said main unit including a first storage circuit storing information for specifying itself and said handset sub unit including a second storage circuit for storing information for specifying the main unit to which the handset sub unit itself is connected, wherein said main-sub relation setting apparatus is capable of communicating with an arbitrarily main unit through a first communication medium with no handset sub unit therebetween, and capable of communicating with a handset sub unit through a second communication medium with no main unit therebetween;

said main-sub relation setting apparatus comprising:

a first communication circuit connected to said first communication medium, and reading information stored in the first storage circuit of the main unit connected to said main-sub relation setting apparatus through said first communication medium;

a second communication circuit connected to said second communication medium and said first communication circuit, and based on said information read by said first communication circuit, writing to the second storage circuit of the sub unit connected to said main-sub relation setting apparatus through said second communication medium, information for identifying the main unit to which said sub unit is connected;

wherein said main-sub relation setting apparatus causes sub unit information to be added to said main unit with no handset sub unit being provided between the main-sub relation setting apparatus and the main unit;

wherein said first storage circuit includes a circuit storing main unit information for identifying itself, and sub unit identification information for identifying a sub unit connected to itself;

said second storage circuit includes a circuit storing said main unit information and sub unit information for distinguishing itself from other sub unit connected to the same main unit as itself;

said first communication circuit includes a circuit reading said main unit information stored in said first storage circuit and reading and writing said sub unit identification information;

said second communication circuit includes a circuit writing said main unit information and said sub unit information to said second storage circuit;

said main-sub relation setting apparatus further comprising a control circuit connected to said first communication circuit and said second communication circuit, based on said read main unit information and said sub unit identifying information, generating and transmitting to said second communication circuit, sub unit information of a sub unit to be newly connected to said arbitrary main unit, and based on read said sub unit identifying information, generating and transmitting to said first communication circuit, sub unit identifying information identifying sub units connected to said arbitrary main unit including a sub unit to be newly connected.

2. The main-sub relation setting apparatus according to claim 1, wherein said main unit is placed at a first location, and said main-sub relation setting apparatus is placed at a second location different from said first location and connectable to said main unit by said first communication medium;

said main-sub relation setting apparatus further comprising an activating circuit activating said first communication circuit and said second communication circuit, based on information transmitted from said first location.

3. The main-sub relation setting apparatus according to claim 1, wherein said main unit is placed at a first location, and said main-sub relation setting apparatus is placed at a second location different from said first location and connectable to said main unit by said first communication medium;

said main-sub relation setting apparatus further comprising an activating circuit, responsive to an instruction to add a new sub unit to said arbitrary main unit transmitted from said second location, establishing communication with a designated main unit and activating said first communication circuit and said second communication circuit.

4. A main-sub relation setting apparatus, for setting main-sub relation of electric appliances including a main unit and one or more handset sub units connected to said main unit, said main unit including a first storage circuit storing information for specifying itself and said handset sub unit including a second storage circuit for storing information for specifying the main unit to which the handset sub unit itself is connected, wherein said main-sub relation setting apparatus is capable of communicating with an arbitrarily main unit through a first communication medium with no handset sub unit therebetween, and capable of communicating with a handset sub unit through a second communication medium with no main unit therebetween;

said main-sub relation setting apparatus comprising:
- a first communication circuit connected to said first communication medium, and reading information stored in the first storage circuit of the main unit connected to said main-sub relation setting apparatus through said first communication medium;
- a second communication circuit connected to said second communication medium and said first communication circuit, and based on said information read by said first communication circuit, writing to the second storage circuit of the sub unit connected to said main-sub relation setting apparatus through said second communication medium, information for identifying the main unit to which said sub unit is connected;
- wherein said main-sub relation setting apparatus causes sub unit information to be added to said main unit with no handset sub unit being provided between the main-sub relation setting apparatus and the main units;
- said main unit is placed at a first location, and said main-sub relation setting apparatus is placed at a second location different from said first location and connectable to said main unit by said first communication medium;
- said main-sub relation setting apparatus further comprising an activating circuit, responsive to an instruction to add a new sub unit to said arbitrary main unit transmitted from said second location, establishing communication with a designated main unit and activating said first communication circuit and said second communication circuit; and a vending unit responsive to an instruction to add a new sub unit to said arbitrary main unit, vending a sub unit having information for specifying a main unit to which said sub unit is to be connected, stored in the second storage circuit of said new sub unit by said second communication circuit.

5. The main-sub relation setting apparatus according to claim 1, further comprising a display unit connected to said second communication circuit, and displaying a communication history between said second communication circuit and a sub unit.

6. The main-sub relation setting apparatus according to claim 1, wherein said electronic appliance is a cordless telephone system.

7. A main-sub relation setting apparatus, for setting main-sub relation of electric appliances including a main unit and one or more handset sub units connected to said main unit, said main unit including first storage means for storing information for specifying itself and said handset sub unit includes second storage means for storing information for specifying the main unit to which the handset sub unit itself is connected, wherein
    said main-sub relation setting apparatus is capable of communicating with an arbitrarily main unit through a first communication medium and capable of communicating a sub unit through a second communication medium;
    said main-sub relation setting apparatus comprising:
        first communication means connected to said first communication medium for reading information stored in the first storage means of the main unit connected to said main-sub relation setting apparatus through said first communication medium;
        second communication means connected to said second communication medium and said first communication means, based on said information read by said first communication means for writing to the second storage means of the sub unit connected to said main-sub relation setting apparatus through said second communication medium, information for identifying the main unit to which said sub unit is connected;
    wherein said main-sub relation setting apparatus causes sub unit information to be added to said main unit with no handset sub unit being provided between the main-sub relation setting apparatus and the main unit;
    wherein said first storage means includes means for storing main unit information for identifying itself, and sub unit identification information for identifying a sub unit connected to itself;
    said second storage means includes means for storing said main unit information and sub unit information for distinguishing itself from other sub unit connected to the same main unit as itself;
    said first communication means includes means for reading said main unit information stored in said first storage means and reading and writing said sub unit identification information;
    said second communication means includes means for writing said main unit information and said sub unit information to said second storage means;
    said main-sub relation setting apparatus further comprising
        control means connected to said first communication means and said second communication means, based on said read main unit information and said sub unit identifying information, for generating and transmitting to said second communication means, sub unit information of a sub unit to be newly connected to said arbitrary main unit, and based on said read sub unit identifying information, generating and transmitting to said first communication means, sub unit identifying information identifying sub units connected to said arbitrary main unit including a sub unit to be newly connected.

8. The main-sub relation setting apparatus according to claim 7, wherein
    said main unit is placed at a first location, and said main-sub relation setting apparatus is placed at a second location different from said first location and connectable to said main unit by said first communication medium;
    said main-sub relation setting apparatus further comprising activating means for activating said first communication means and said second communication means, based on information transmitted from said first location.

9. The main-sub relation setting apparatus according to claim 7, wherein
    said main unit is placed at a first location, and said main-sub relation setting apparatus is placed at a second location different from said first location and connectable to said main unit by said first communication medium;
    said main-sub relation setting apparatus further comprising activating means, responsive to an instruction to add a new sub unit to said arbitrary main unit transmitted from said second location, for establishing communication with a designated main unit and activating said first communication means and said second communication means.

10. The main-sub relation setting apparatus according to claim 7, further comprising display means connected to said second communication means, for displaying a communication history between said second communication means and a sub unit.

11. The main-sub relation setting apparatus according to claim 7, wherein said electronic appliance is a cordless telephone system.

12. A main-sub relation setting apparatus, for setting main-sub relation of electric appliances including a main unit and one or more handset sub units connected to said main unit, said main unit including first storage means for storing information for specifying itself and said handset sub unit includes second storage means for storing information for specifying the main unit to which the handset sub unit itself is connected, wherein said main-sub relation setting apparatus is capable of communicating with an arbitrarily main unit through a first communication medium and capable of communicating a sub unit through a second communication medium;

said main-sub relation setting apparatus comprising:
first communication means connected to said first communication medium for reading information stored in the first storage means of the main unit connected to said main-sub relation setting apparatus through said first communication medium;
second communication means connected to said second communication medium and said first communication means, based on said information read by said first communication means for writing to the second storage means of the sub unit connected to said main-sub relation setting apparatus through said second communication medium, information for identifying the main unit to which said sub unit is connected;
wherein said main-sub relation setting apparatus causes sub unit information to be added to said main unit with no handset sub unit being provided between the main-sub relation setting apparatus and the main unit;
said main unit is placed at a first location, and said main-sub relation setting apparatus is placed at a second location different from said first location and connectable to said main unit by said first communication medium;
said main-sub relation setting apparatus further comprising activating means, responsive to an instruction to add a new sub unit to said arbitrary main unit transmitted from said second location, for establishing communication with a designated main unit and activating said first communication means and said second communication means; and
vending means responsive to an instruction to add a new sub unit to said arbitrary main unit, for vending a sub unit having information for specifying a main unit to which said sub unit is to be connected, stored in the second storage means of said new sub unit by said second communication means.

13. A method of setting a main-sub relation in a main-sub relation setting apparatus for setting a main-sub relation of electric appliances including a main unit and one or more handset sub units connected to said main unit, wherein said main unit includes a first storage circuit storing information for identifying itself, and said handset sub unit includes a second storage circuit storing information for identifying a main unit to which the handset sub unit itself is connected, said main-sub relation setting apparatus being capable of communicating with an arbitrary main unit through a first communication medium and capable of communicating with a handset sub unit through a second communication medium;

said method of setting main-sub relation comprising:
preparing communication with a main unit connected to said main-sub relation setting apparatus through the first communication medium;
preparing communication with a handset sub unit connected to said main-sub relation setting apparatus through the second communication medium;
reading information stored in the first storage circuit of the main unit connected to said main-sub relation setting apparatus through said first communication medium; and
writing, based on the read information of the main unit, information for identifying a main unit to which said handset sub unit is to be connected, in the second storage circuit of the handset sub unit connected to said main-sub relation setting apparatus through said second communication medium so that the main-sub relation setting apparatus causes sub unit information to be added to the main unit with no handset sub unit being provided between the main-sub relation setting apparatus and the main unit;
wherein said first storage circuit includes a circuit for storing main unit information for specifying itself and sub unit identifying information for identifying a sub unit connected to itself;
said second storage circuit includes a circuit storing said main unit information and sub unit information for identifying itself from other sub unit connected to the same main unit as itself;
said method of setting main-sub relation further comprising the steps of:
based on said read main unit information and said sub unit identifying information, generating sub unit information of a sub unit to be newly connected to said arbitrary main unit and writing the generated information to said second storage circuit through said second communication medium; and
based on said read sub unit identifying information, generating sub unit identifying information identifying sub units connected to said arbitrary main unit including the sub unit to be newly connected, and writing the generated information to said first storage circuit through said first communication medium.

14. The method of setting main-sub relation according to claim 13, wherein said main unit is placed at a first location, and said main-sub relation setting apparatus is placed at a second location different from said first location and connectable to said main unit by said first communication medium;

said method of setting main-sub relation further comprising the step of preparing communication with said main unit and preparing communication with said sub unit, based on information transmitted from said first location.

15. The method of setting main-sub relation according to claim 13, wherein said main unit is placed at a first location, and said main-sub relation setting apparatus is placed at a second location different from said first location and connectable to said main unit by said first communication medium;

said method of setting main-sub relation further comprising the step of establishing communication with a designated main unit, in response to an instruction to add a new sub unit to said arbitrary main unit transmitted from said second location, preparing communication with said main unit and preparing communication with said sub unit.

16. A method of setting a main-sub relation in a main-sub relation setting apparatus for setting a main-sub relation of electric appliances including a main unit and one or more handset sub units connected to said main unit, wherein said main unit includes a first storage circuit storing information for identifying itself, and said handset sub unit includes a second storage circuit storing information for identifying a main unit to which the handset sub unit itself is connected, said main-sub relation setting apparatus being capable of communicating with an arbitrary main unit through a first communication medium and capable of communicating with a handset sub unit through a second communication medium;

said method of setting main-sub relation comprising:

preparing communication with a main unit connected to said main-sub relation setting apparatus through the first communication medium;

preparing communication with a handset sub unit connected to said main-sub relation setting apparatus through the second communication medium;

reading information stored in the first storage circuit of the main unit connected to said main-sub relation setting apparatus through said first communication medium; and writing, based on the read information of the main unit, information for identifying a main unit to which said handset sub unit is to be connected, in the second storage circuit of the handset sub unit connected to said main-sub relation setting apparatus through said second communication medium so that the main-sub relation setting apparatus causes sub unit information to be added to the main unit with no handset sub unit being provided between the main-sub relation setting apparatus and the main unit;

said main unit is placed at a first location, and said main-sub relation setting apparatus is placed at a second location different from said first location and connectable to said main unit by said first communication medium;

said method of setting main-sub relation further comprising the step of establishing communication with a designated main unit, in response to an instruction to add a new sub unit to said arbitrary main unit transmitted from said second location, preparing communication with said main unit and preparing communication with said sub unit;

in response to an instruction to add a new sub unit to said arbitrary main unit, setting said sub unit having information for identifying the main unit to which said sub unit is to be connected stored in the second storage circuit of said new sub unit through said second communication medium.

17. The method of setting main-sub relation according to claim 12, further comprising the step of displaying communication history with a sub unit through said second communication medium.

* * * * *